United States Patent
Batchelder et al.

(10) Patent No.: US 10,759,107 B2
(45) Date of Patent: *Sep. 1, 2020

(54) RIBBON FILAMENT AND ASSEMBLY FOR USE IN EXTRUSION-BASED DIGITAL MANUFACTURING SYSTEMS

(71) Applicant: Stratasys, Inc., Eden Prairie, MN (US)

(72) Inventors: J. Samuel Batchelder, Somers, NY (US); William J. Swanson, St. Paul, MN (US); S. Scott Crump, Wayzata, MN (US)

(73) Assignee: STRATASYS, INC., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,452

(22) Filed: Apr. 19, 2019

(65) Prior Publication Data

US 2019/0240970 A1    Aug. 8, 2019

Related U.S. Application Data

(60) Continuation of application No. 15/420,771, filed on Jan. 31, 2017, now Pat. No. 10,272,665, which is a
(Continued)

(51) Int. Cl.
*B32B 37/15*    (2006.01)
*D01F 1/02*    (2006.01)
(Continued)

(52) U.S. Cl.
CPC ............ *B29C 48/05* (2019.02); *B29C 48/002* (2019.02); *B29C 48/0021* (2019.02);
(Continued)

(58) Field of Classification Search
CPC .............. B29C 48/002; B29C 48/0021; B29C 48/0022; B29C 48/18; B29C 48/21;
(Continued)

(56) References Cited

U.S. PATENT DOCUMENTS 4,083,914 A * 4/1978 Schippers .............. D01D 5/423
264/147
4,113,935 A    9/1978 Schippers et al.
(Continued)

FOREIGN PATENT DOCUMENTS

GB    816016    7/1959
GB    2291003 A    1/1996
(Continued)

OTHER PUBLICATIONS

International Search Report and Written Opinion dated Dec. 14, 2010 from International Patent Application No. PCT/US2010/049607, filed Sep. 21, 2010.
(Continued)

*Primary Examiner* — Leo B Tentoni
(74) *Attorney, Agent, or Firm* — Westman, Champlin & Koehler, P.A.

(57) ABSTRACT

A consumable material for use in an extrusion-based digital manufacturing system, the consumable material comprising a length and a cross-sectional profile of at least a portion of the length that is axially asymmetric. The cross-sectional profile is configured to provide a response time with a non-cylindrical liquefier of the extrusion-based digital manufacturing system that is faster than a response time achievable with a cylindrical filament in a cylindrical liquefier for a same thermally limited, maximum volumetric flow rate.

19 Claims, 9 Drawing Sheets

Related U.S. Application Data continuation of application No. 13/530,191, filed on Jun. 22, 2012, now Pat. No. 9,586,357, which is a division of application No. 12/612,333, filed on Nov. 4, 2009, now Pat. No. 8,221,669.

(60) Provisional application No. 61/247,067, filed on Sep. 30, 2009.

(51) Int. Cl.

| | |
|---|---|
| *D01F 1/10* | (2006.01) |
| *B29C 48/05* | (2019.01) |
| *B33Y 70/00* | (2020.01) |
| *B33Y 30/00* | (2015.01) |
| *B33Y 40/00* | (2020.01) |
| *B29C 69/00* | (2006.01) |
| *D01D 5/42* | (2006.01) |
| *B32B 38/00* | (2006.01) |
| *B32B 38/18* | (2006.01) |
| *B29C 48/06* | (2019.01) |
| *B29C 48/21* | (2019.01) |
| *B29C 48/00* | (2019.01) |
| *B29C 48/80* | (2019.01) |
| *B29C 48/88* | (2019.01) |
| *B29C 64/118* | (2017.01) |
| *B29C 48/18* | (2019.01) |
| *B33Y 50/02* | (2015.01) |
| *B33Y 10/00* | (2015.01) |
| *B32B 38/04* | (2006.01) |
| *B29L 7/00* | (2006.01) |
| *B29K 509/00* | (2006.01) |
| *B29K 509/08* | (2006.01) |
| *B29K 509/04* | (2006.01) |
| *B29K 509/02* | (2006.01) |
| *B29K 509/10* | (2006.01) |
| *B29K 101/12* | (2006.01) |

(52) U.S. Cl.
CPC .......... *B29C 48/0022* (2019.02); *B29C 48/06* (2019.02); *B29C 48/18* (2019.02); *B29C 48/21* (2019.02); *B29C 48/832* (2019.02); *B29C 48/914* (2019.02); *B29C 64/118* (2017.08); *B29C 69/001* (2013.01); *B32B 37/153* (2013.01); *B32B 38/0004* (2013.01); *B32B 38/185* (2013.01); *B33Y 30/00* (2014.12); *B33Y 40/00* (2014.12); *B33Y 50/02* (2014.12); *B33Y 70/00* (2014.12); *D01D 5/423* (2013.01); *D01D 5/426* (2013.01); *B29K 2101/12* (2013.01); *B29K 2509/00* (2013.01); *B29K 2509/02* (2013.01); *B29K 2509/04* (2013.01); *B29K 2509/08* (2013.01); *B29K 2509/10* (2013.01); *B29L 2007/007* (2013.01); *B32B 2038/045* (2013.01); *B32B 2250/02* (2013.01); *B32B 2250/03* (2013.01); *B32B 2250/24* (2013.01); *B32B 2264/10* (2013.01); *B32B 2264/101* (2013.01); *B32B 2264/102* (2013.01); *B32B 2264/104* (2013.01); *B32B 2264/107* (2013.01); *B32B 2264/108* (2013.01); *B33Y 10/00* (2014.12); *Y10T 428/2913* (2015.01); *Y10T 428/2929* (2015.01); *Y10T 428/2973* (2015.01)

(58) Field of Classification Search
CPC .............. B29C 69/001; B29K 2101/12; B29K 2509/00; B29K 2509/02; B29K 2509/04; B29K 2509/08; B29K 2509/10; B29L 2007/007; B32B 37/15; B32B 37/153; B32B 38/0004; B32B 2038/045; B32B 38/185; B32B 2250/02; B32B 2250/03; B32B 2250/24; B32B 2264/10; B32B 2264/101; B32B 2264/102; B32B 2264/104; B32B 2264/107; B32B 2264/108; D01D 5/423; D01D 5/426; D01F 1/02; D01F 1/10

USPC ...... 264/129, 134, 146, 147, 173.11, 173.12, 264/173.15, 173.16, 173.17, 177.1, 264/177.13, 211, 284

See application file for complete search history.

(56) References Cited

U.S. PATENT DOCUMENTS

| | | |
|---|---|---|
| 4,639,155 A | 1/1987 | Schuster et al. |
| 4,749,347 A | 6/1988 | Valavaara |
| 4,797,313 A | 1/1989 | Stolk et al. |
| 5,121,329 A | 6/1992 | Crump |
| 5,169,081 A | 12/1992 | Goedderz |
| 5,303,141 A | 4/1994 | Batchelder et al. |
| 5,312,224 A | 5/1994 | Batchelder et al. |
| 5,340,433 A | 8/1994 | Crump |
| 5,342,687 A | 8/1994 | Iwai et al. |
| 5,424,119 A | 6/1995 | Phillips et al. |
| 5,503,785 A | 4/1996 | Crump et al. |
| 5,578,227 A | 11/1996 | Rabinovich |
| 5,738,817 A | 4/1998 | Danforth et al. |
| 5,764,521 A | 6/1998 | Batchelder et al. |
| 5,866,058 A | 2/1999 | Batchelder et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,153,034 A | 11/2000 | Lipsker |
| 6,228,923 B1 | 5/2001 | Lombardi et al. |
| 6,257,517 B1 | 7/2001 | Babish et al. |
| 6,302,309 B1 | 10/2001 | Drader |
| 6,459,069 B1 | 10/2002 | Rabinovich |
| 6,547,995 B1 | 4/2003 | Comb |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,866,807 B2 | 3/2005 | Comb et al. |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,172,715 B2 | 2/2007 | Swanson et al. |
| 7,363,686 B2 | 4/2008 | Fukuyasu et al. |
| 8,221,669 B2 | 7/2012 | Batchelder et al. |
| 2003/0056870 A1 | 3/2003 | Comb et al. |
| 2005/0046065 A1 | 3/2005 | Cowan et al. |
| 2005/0101684 A1 | 5/2005 | You et al. |
| 2005/0136772 A1* | 6/2005 | Chen ............. B32B 27/32 442/381 |
| 2007/0003656 A1 | 1/2007 | LaBossiere et al. |
| 2007/0228590 A1 | 10/2007 | LaBossiere et al. |
| 2008/0213419 A1 | 9/2008 | Skubic et al. |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0096072 A1 | 4/2010 | Hopkins et al. |
| 2010/0096485 A1 | 4/2010 | Taatjes et al. |

(56) References Cited

U.S. PATENT DOCUMENTS

2010/0096489 A1     4/2010   Taatjes et al.
2011/0076495 A1     3/2011   Batchelder et al.

FOREIGN PATENT DOCUMENTS

WO        9737810 A1    10/1997
WO     2007130229 A2    11/2007

OTHER PUBLICATIONS

Techspan Group, "Technical Data Sheet—Techspan Plastic Welding Rods", dated Dec. 31, 2007, retrieved from URL:http://www.techspanonline.com/data/media/documents/pdf/7.%20TechspanRodList2007.pdf, retrieved Nov. 4, 2010.
Examiner's Report dated Dec. 27, 2012 from Canadian Patent Application No. 2,775,076.
Adrian Bowyer, Drink Bottle Feedstock, Mar. 15, 2009, at http://blog.reprap.org/2009/03/drink-bottle-feedstock.html.
Elastic Properties and Young Modulus for some Materials, http://www.engineeringtoolbox.com/young-modulus-d_417.html, web.archive.org snapshot from Feb. 18, 2007.

\* cited by examiner

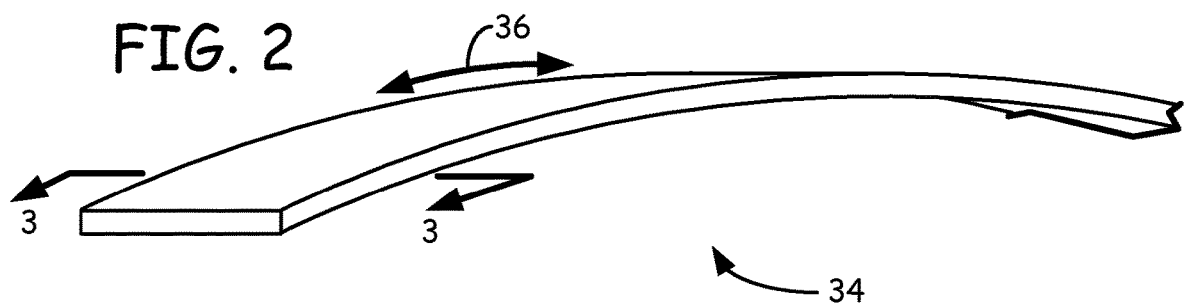
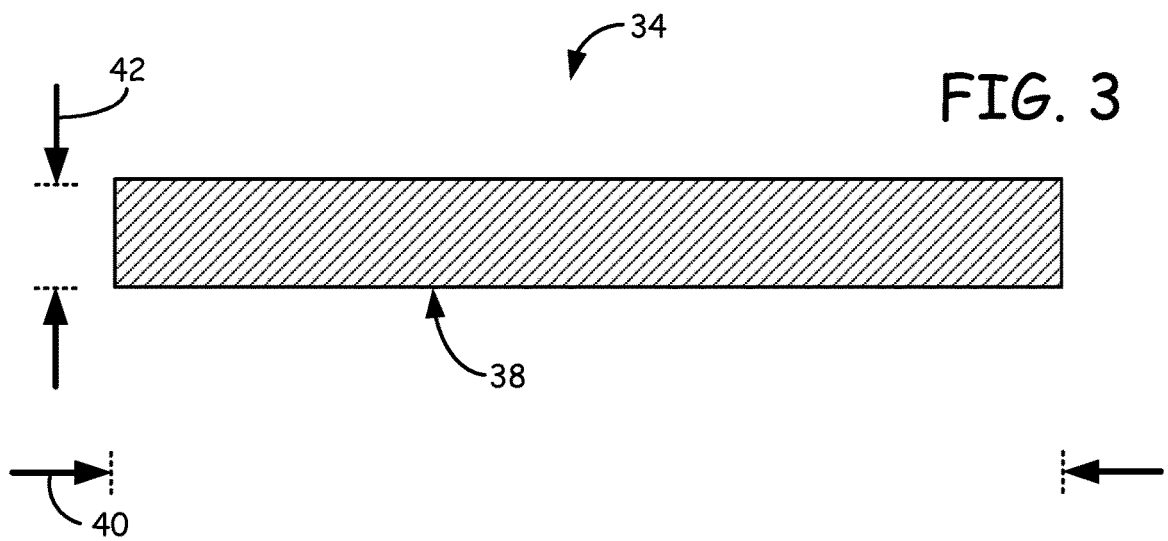

RIBBON FILAMENT AND ASSEMBLY FOR USE IN EXTRUSION-BASED DIGITAL MANUFACTURING SYSTEMS

CROSS-REFERENCE TO RELATED APPLICATION(S)

This is a continuation of U.S. patent application Ser. No. 15/420,771, filed Jan. 31, 2017, published as U.S. Pat. No. 10,272,665, which is a continuation of U.S. patent application Ser. No. 13/530,191, file Jun. 22, 2012, published as U.S. Pat. No. 9,586,357, which is a divisional application of U.S. patent application Ser. No. 12/612,333, filed on Nov. 4, 2009, and entitled "Non-Cylindrical Filament For Use In Extrusion-Based Digital Manufacturing Systems" which published as U.S. Pat. No. 8,221,669; which claims priority to U.S. Provisional Patent Application No. 61/247,067, filed on Sep. 30, 2009, and entitled "Non-Cylindrical Filament For Use In Extrusion-Based Digital Manufacturing Systems".

BACKGROUND

The present disclosure relates to direct digital manufacturing systems for building three-dimensional (3D) models. In particular, the present invention relates to consumable materials, such as modeling and support materials, for use in extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable consumable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Consumable support material is then deposited from a second nozzle pursuant to the generated geometry during the build process. The support material adheres to the modeling material during fabrication, and is removable from the completed 3D model when the build process is complete.

SUMMARY

A first aspect of the present disclosure is directed to a ribbon filament for use in an extrusion-based digital manufacturing system with a ribbon liquefier to build a three-dimensional model in a layer-by-layer manner. The ribbon filament includes a composition comprising at least one extrudable material, and a length that is continuous for at least a distance such that the ribbon filament is feedable from a supply source to the ribbon liquefier retained by a moveable head of the extrusion-based digital manufacturing system. The ribbon filament also includes a cross-sectional profile of the length that is axially asymmetric and having a width and a thickness, wherein the width ranges from about 1.0 millimeter to about 10.2 millimeters, where the thickness ranges from about 0.51 millimeters to about 1.0 millimeter, and where the cross-sectional profile of the ribbon filament has a cross-sectional aspect ratio of the width to the thickness ranging from about 2.5:1 to about 20:1. The ribbon filament exhibits a flexibility such that the ribbon filament does not plastically deform or fracture while retained by the supply source or when fed from the supply source to the ribbon liquefier, and a Young's Modulus value ranging from about 1.0 gigapascal to about 5.0 gigapascals.

Another aspect of the present disclosure is directed to an assembly for use in an extrusion-based digital manufacturing system with a ribbon liquefier to build a three-dimensional model in a layer-by-layer manner. The assembly includes a supply source configured to engage the extrusion-based digital manufacturing system, and a ribbon filament retained by the supply source. The ribbon filament includes a composition comprising at least one extrudable material, and a length that is continuous for at least a distance such that the ribbon filament is feedable from the supply source to the ribbon liquefier retained by a moveable head of the extrusion-based digital manufacturing system. The ribbon filament also includes a rectangular cross-sectional profile of the length, which is configured to mate with the ribbon liquefier having an entrance cross-sectional area $A_e$ and a hydraulic diameter $D_h$ with the ribbon filament, where $D_h < 0.95 \sqrt{A_e}$, and where the rectangular cross-sectional profile has a width and a thickness with a cross-sectional aspect ratio of the width to the thickness ranging from about 2.5:1 to about 20:1. The ribbon filament exhibits a flexibility such that the ribbon filament does not plastically deform or fracture while retained by the supply source or when fed from the supply source to the ribbon liquefier, and a Young's Modulus value ranging from about 1.0 gigapascal to about 5.0 gigapascals.

Another aspect of the present disclosure is directed to an assembly for use in an extrusion-based digital manufacturing system with a ribbon liquefier to build a three-dimensional model in a layer-by-layer manner. The assembly includes a container configured to engage the extrusion-based digital manufacturing system, a pathway from the container and configured to extend to a ribbon liquefier retainable by a moveable head of the extrusion-based digital manufacturing system, and a ribbon filament at least partially retained within the container and feedable through the pathway from the container to the ribbon liquefier. The ribbon filament includes a composition comprising at least one extrudable material, a length, and a rectangular cross-sectional profile of the length, which is configured to mate with the ribbon liquefier having an entrance cross-sectional area $A_e$ and a hydraulic diameter $D_h$ with the ribbon filament, where $D_h < 0.95 \sqrt{A_e}$, and where the rectangular cross-sectional profile has a width and a thickness with a cross-sectional aspect ratio of the width to the thickness ranging from about 2.5:1 to about 20:1. The ribbon filament exhibits a flexibility such that the ribbon filament does not plastically deform or fracture while retained by the supply source or when fed from the supply source to the ribbon liquefier, and a Young's Modulus value ranging from about 1.0 gigapascal to about 5.0 gigapascals.

BRIEF DESCRIPTION OF THE DRAWINGS

FIG. 2 is a perspective view of a ribbon filament, which is a non-cylindrical filament having a rectangular cross-sectional profile.

FIG. 3 is a sectional view of section 3-3 taken in FIG. 2, illustrating the cross-sectional profile of the ribbon filament.

DETAILED DESCRIPTION

The present disclosure is directed to non-cylindrical filaments of modeling and support materials for use in extrusion-based digital manufacturing systems, and methods and systems for manufacturing the non-cylindrical filaments. As discussed below, the non-cylindrical filaments are consumable materials capable of being melted and extruded from non-cylindrical liquefiers with reduced response times compared to cylindrical filaments melted and extruded from cylindrical liquefiers with the same volumetric flow rates. This is beneficial for improving depositional accuracies and reducing build times, thereby increasing process efficiencies for building 3D models and corresponding support structures.

As used herein, the term "non-cylindrical filament" refers to a filament of a modeling or support material having a cross-sectional profile that is non-circular (e.g., a rectangular cross-sectional profile). This is in comparison to a "cylindrical filament", which has a cross-sectional profile that is circular. Correspondingly, as used herein, the term "non-cylindrical liquefier" refers to a liquefier having a channel with a cross-sectional profile that is non-circular (e.g., a rectangular or arcuate cross-sectional profile) for receiving a non-cylindrical filament. This is in comparison to a "cylindrical liquefier", which has a channel with a cross-sectional profile that is circular for receiving a cylindrical filament.

Figure 1:
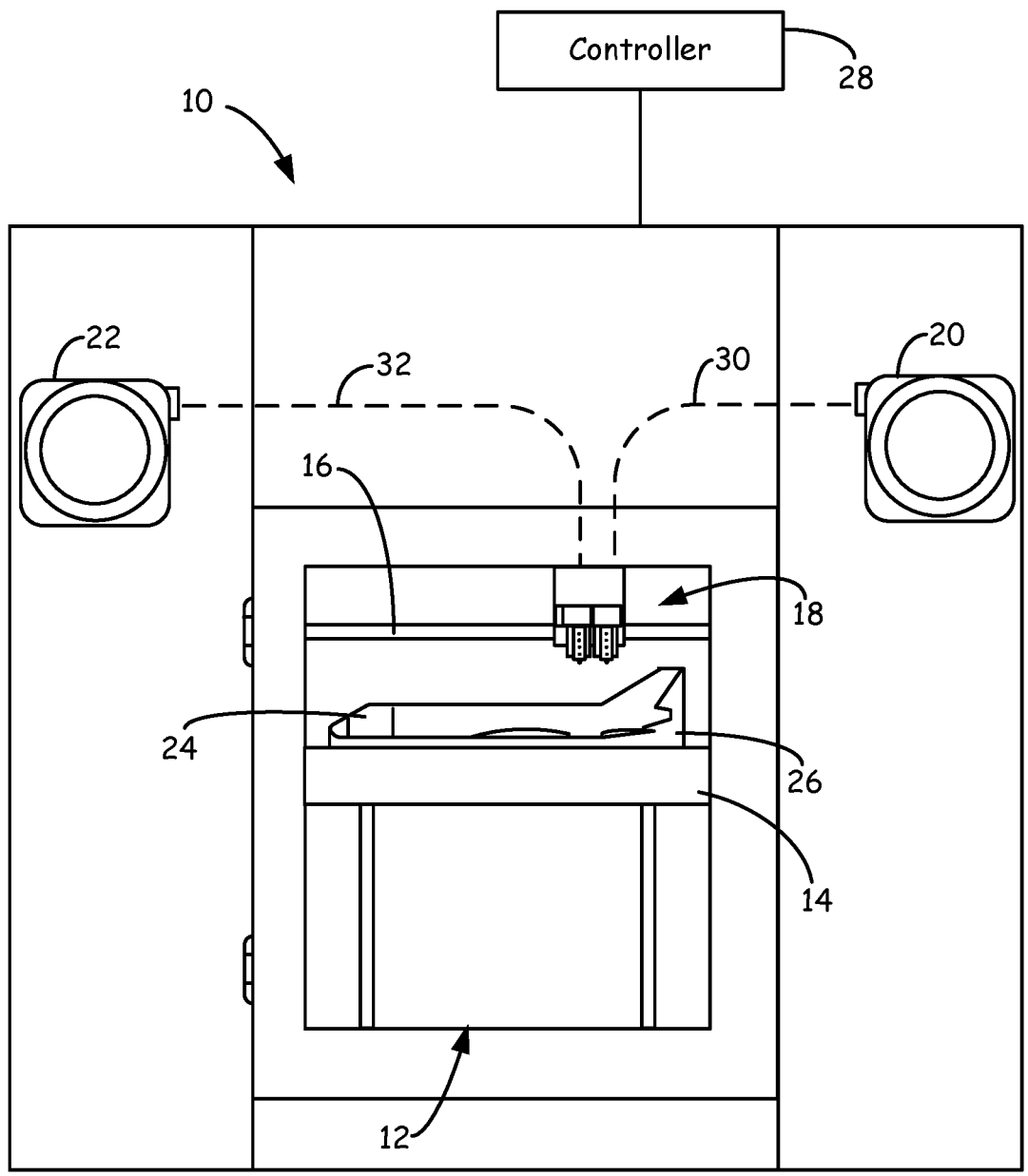
FIG. 1 is a front view of an extrusion-based digital manufacturing system for building 3D models and support structures from non-cylindrical filaments of modeling and support materials.

FIG. 1 is a front view of system 10, which is an extrusion-based digital manufacturing system that includes build chamber 12, platen 14, gantry 16, extrusion head 18, and supply sources 20 and 22, where extrusion head 18 is configured to receive and melt successive portions of non-cylindrical filaments (not shown in FIG. 1) during a build operation. Suitable extrusion-based digital manufacturing systems for system 10 include fused deposition modeling systems developed by Stratasys, Inc., Eden Prairie, Minn.

Build chamber 12 is an enclosed environment that contains platen 14, gantry 16, and extrusion head 18 for building a 3D model (referred to as 3D model 24) and a corresponding support structure (referred to as support structure 26). Platen 14 is a platform on which 3D model 24 and support structure 26 are built, and moves along a vertical z-axis based on signals provided from a computer-operated controller (referred to as controller 28). Gantry 16 is a guide rail system configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. Extrusion head 18 includes a pair of non-cylindrical liquefiers (not shown in FIG. 1), where the first non-cylindrical liquefier is configured to receive and melt successive portions of a non-cylindrical, modeling material filament, and the second non-cylindrical liquefier is configured to receive and melt successive portions of a non-cylindrical, support material filament.

The non-cylindrical, modeling material filament may be provided to extrusion head 18 from supply source 20 through pathway 30. Similarly, the non-cylindrical, support material filament may be provided to extrusion head 18 from supply source 22 through pathway 32. System 10 may also include additional drive mechanisms (not shown) configured to assist in feeding the non-cylindrical filaments from supply sources 20 and 22 to extrusion head 18. Supply sources 20 and 22 are sources (e.g., spooled containers) for the non-cylindrical filaments, and are desirably retained at a remote location from build chamber 12. Suitable assemblies for supply sources 20 and 22 include those disclosed in Swanson et al., U.S. Pat. No. 6,923,634; Comb et al., U.S. Pat. No. 7,122,246; and Taatjes et al, U.S. Patent Application Publication Nos. 2010/0096489 and 2010/0096485.

During a build operation, gantry 16 moves extrusion head 18 around in the horizontal x-y plane within build chamber 12, and the non-cylindrical filaments are fed to extrusion head 18. Extrusion head 18 thermally melts the successive portions of the received modeling material filament, thereby allowing the molten material to be extruded to build 3D model 24. Similarly, extrusion head 18 thermally melts the successive portions of the support material filament, thereby allowing the molten material to be extruded to build support structure 26. The upstream, unmelted portions of the non-cylindrical filaments may each function as a piston with a viscosity-pump action to extrude the molten material out of the respective liquefiers of extrusion head 18.

The extruded modeling and support materials are deposited onto platen 14 to build 3D model 24 and support structure 26 using a layer-based additive technique. Support structure 26 is desirably deposited to provide vertical support along the z-axis for overhanging regions of the layers of 3D model 24. After the build operation is complete, the resulting 3D model 24/support structure 26 may be removed from build chamber 12, and support structure 26 may be removed from 3D model 24.

As discussed below, the cross-sectional profiles of the non-cylindrical filaments and liquefiers allow the non-cylindrical filaments to be melted and extruded from extrusion head 18 with reduced response times compared to cylindrical filaments and liquefiers. This increases process efficiencies in system 10 for building 3D model 24 and support structure 26. For example, reduced response times may increase the accuracy of start and stop locations for deposited roads of modeling and support materials. During a build operation to form a layer of a 3D model (e.g., 3D model 24), an extrusion head (e.g., extrusion head 18) is moved in a horizontal x-y plane and deposits a molten modeling material. After a given deposition pattern is completed, the extrusion head stops depositing the modeling material. This is accomplished by stopping the filament from being fed into the liquefier of the extrusion head, thereby halting the viscosity-pump action of the filament.

However, the response time between when the extrusion head stops feeding the filament to the liquefier and when the modeling material actually stops extruding from the extrusion head is not instantaneous. Instead, there is a delay that is based on factors such as the thermal properties of the liquefier, the composition of the filament, and, as discussed below, the cross-sectional profile of the filament and liquefier channel. Similarly, there is also a response time delay associated with the transition from a zero-flow state to a steady-state flow. Liquefiers and filaments that require large response times increase these delays, thereby potentially decreasing depositional accuracies. Reducing the response times, however, can improve the aesthetic and structural qualities of the resulting 3D model, particularly when building 3D models containing fine features.

For example, a reduced response time for system 10 can gate the acceleration of gantry 16 at suitable locations near the deposition start and stop points. This can increase the ability to hide the seams of each layer, which can increase part quality. Additionally, the response time determines how far gantry 16 can deviate from a constant tangential velocity as gantry 16 travels around a corner in the x-y plane. As a result, a reduced response time allows extrusion head 18 to achieve greater cornering accelerations and decelerations. This can reduce the production times required to build 3D models and support structures, much in the same manner as the cornering capabilities of a race car are important for reducing an overall race time.

For ease of discussion, the following disclosure is made with reference to a non-cylindrical filament having a rectangular cross-sectional profile (referred to as a ribbon filament), and a non-cylindrical liquefier having a corresponding rectangular channel for receiving the ribbon filament. The present disclosure, however, is also applicable to non-cylindrical filaments having a variety of different cross-sectional profiles that reduce response times compared to cylindrical filaments.

FIG. 2 is a perspective view of ribbon filament 34, which is a non-cylindrical filament having a rectangular cross-sectional profile and includes length 36. Length 36 is a continuous length that may vary depending on the amount of ribbon filament 34 remaining in supply source 20 or 22 (shown in FIG. 1). Ribbon filament 34 is desirably flexible along length 36 to allow ribbon filament 34 to be retained in supply sources 20 and 22 (e.g., wound on spools) and to be fed through system 10 (e.g., through pathways 30 and 32) without plastically deforming or fracturing. For example, in one embodiment, ribbon filament 34 is desirably capable of withstanding elastic strains greater than t/r, where "t" is a cross-sectional thickness of ribbon filament 34 in the plane of curvature (e.g., thickness 42, shown in FIG. 3), and "r" is a bend radius (e.g., a bend radius in supply source 20 or 22 and/or a bend radius through pathway 30 or 32).

Ribbon filament 34 may be manufactured from a variety of extrudable modeling and support materials for respectively building 3D model 24 and support structure 26 (shown in FIG. 1). Suitable modeling materials for ribbon filament 34 include polymeric and metallic materials. In some embodiments, suitable modeling materials include materials having amorphous properties, such as thermoplastic materials, amorphous metallic materials, and combinations thereof. Examples of suitable thermoplastic materials for ribbon filament 34 include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in U.S. Patent Application Publication No. 2009/0263582.

Suitable support materials for ribbon filament 34 include materials having amorphous properties (e.g., thermoplastic materials) and that are desirably removable from the corresponding modeling materials after 3D model 24 and support structure 26 are built. Examples of suitable support materials for ribbon filament 34 include water-soluble support materials commercially available under the trade designations "WATERWORKS" and "SOLUBLE SUPPORTS" from Stratasys, Inc., Eden Prairie, Minn.; break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Patent Application Publication No. 2010/0096072.

The composition of ribbon filament 34 may also include additional additives, such as plasticizers, rheology modifiers, inert fillers, colorants, stabilizers, and combinations thereof. Examples of suitable additional plasticizers for use in the support material include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof. Examples of suitable inert fillers include calcium carbonate, magnesium carbonate, glass spheres, graphite, carbon black, carbon fiber, glass fiber, talc, wollastonite, mica, alumina, silica, kaolin, silicon carbide, composite materials (e.g., spherical and filamentary composite materials), and combinations thereof. In embodiments in which the composition includes additional additives, examples of suitable combined concentrations of the additional additives in the composition range from about 1% by weight to about 10% by weight, with particularly suitable concentrations ranging from about 1% by weight to about 5% by weight, based on the entire weight of the composition.

Ribbon filament 34 also desirably exhibits physical properties that allow ribbon filament 34 to be used as a consumable material in system 10. In one embodiment, the composition of ribbon filament 34 is substantially homogenous along its length. Additionally, the composition of ribbon filament 34 desirably exhibits a glass transition temperature that is suitable for use in build chamber 12. Examples of suitable glass transition temperatures at atmospheric pressure for the composition of ribbon filament 34 include temperatures of about 80° C. or greater. In some embodiments, suitable glass transition temperatures include about 100° C. or greater. In additional embodiments, suitable glass transition temperatures include about 120° C. or greater.

Ribbon filament 34 also desirably exhibits low compressibility such that its axial compression doesn't cause ribbon filament 34 to be seized within a liquefier. Examples of suitable Young's modulus values for the polymeric compositions of ribbon filament 34 include modulus values of about 0.2 gigapascals (GPa) (about 30,000 pounds-per-square inch (psi)) or greater, where the Young's modulus values are measured pursuant to ASTM D638-08. In some embodiments, suitable Young's modulus range from about 1.0 GPa (about 145,000 psi) to about 5.0 GPa (about 725,000 psi). In additional embodiments, suitable Young's modulus values range from about 1.5 GPa (about 200,000 psi) to about 3.0 GPa (about 440,000 psi).

In some embodiments, as discussed below, ribbon filament 34 may be a multi-layer filament. For example, ribbon filament 34 may include a central layer disposed between exterior layers of different materials. This allows ribbon filament 34 to exhibit a variety of physical and aesthetic qualities. In additional embodiments, ribbon filament 34 may exhibit topographical surface patterns at various locations along length 36. For example, ribbon filament 34 may include topographical surface patterns as disclosed in Batchelder et al., U.S. Patent Application Publication No. 2011/0076495.

FIG. 3 is a sectional view of section 3-3 taken in FIG. 2, illustrating profile 38 of ribbon filament 34. Profile 38 is an axially asymmetric, cross-sectional profile of ribbon filament 34 at a location along length 36. In the shown embodiment, ribbon filament 34 has substantially the same profile 38 along length 36, thereby allowing the entire length 36 to be used during the build operation. Alternatively, one or more portions of length 36 (e.g., the trailing end segment) may be non-usable.

In the shown embodiment, ribbon filament 34 has a cross-sectional width 40 and a cross-sectional thickness 42. Suitable dimensions for width 40 and thickness 42 desirably allow ribbon filament 34 to mate with a rectangular liquefier of extrusion head 18, and also desirably provide a cross-sectional aspect ratio that reduces the response time of the extruded material compared to a cylindrical filament in a cylindrical liquefier with the same volumetric flow rate.

Examples of suitable dimensions for width 40 range from about 1.0 millimeter (about 0.04 inches) to about 10.2 millimeters (about 0.40 inches), with particularly suitable widths ranging from about 2.5 millimeters (about 0.10 inches) to about 7.6 millimeters (about 0.30 inches), and with even more particularly suitable widths ranging from about 3.0 millimeters (about 0.12 inches) to about 5.1 millimeters (about 0.20 inches).

Thickness 42 is desirably thick enough to provide a suitable structural integrity for ribbon filament 34, thereby reducing the risk of fractures or breaks while ribbon filament 34 is retained in supply source 20 or 22 and while being fed through system 10 (e.g., through pathways 30 or 32). Examples of suitable dimensions for thickness 42 range from about 0.08 millimeters (about 0.003 inches) to about 1.5 millimeters (about 0.06 inches), with particularly suitable thicknesses ranging from about 0.38 millimeters (about 0.015 inches) to about 1.3 millimeters (about 0.05 inches), and with even more particularly suitable thicknesses ranging from about 0.51 millimeters (about 0.02 inches) to about 1.0 millimeters (about 0.04 inches).

As discussed below, the aspect ratio of width 40 to thickness 42, and a corresponding aspect ratio of the rectangular liquefier, may be selected to effectively remove the core that is associated with a cylindrical filament having a circular cross-section. This allows ribbon filament 34 to be melted and extruded in a rectangular liquefier with a reduced response time.

Figure 4:
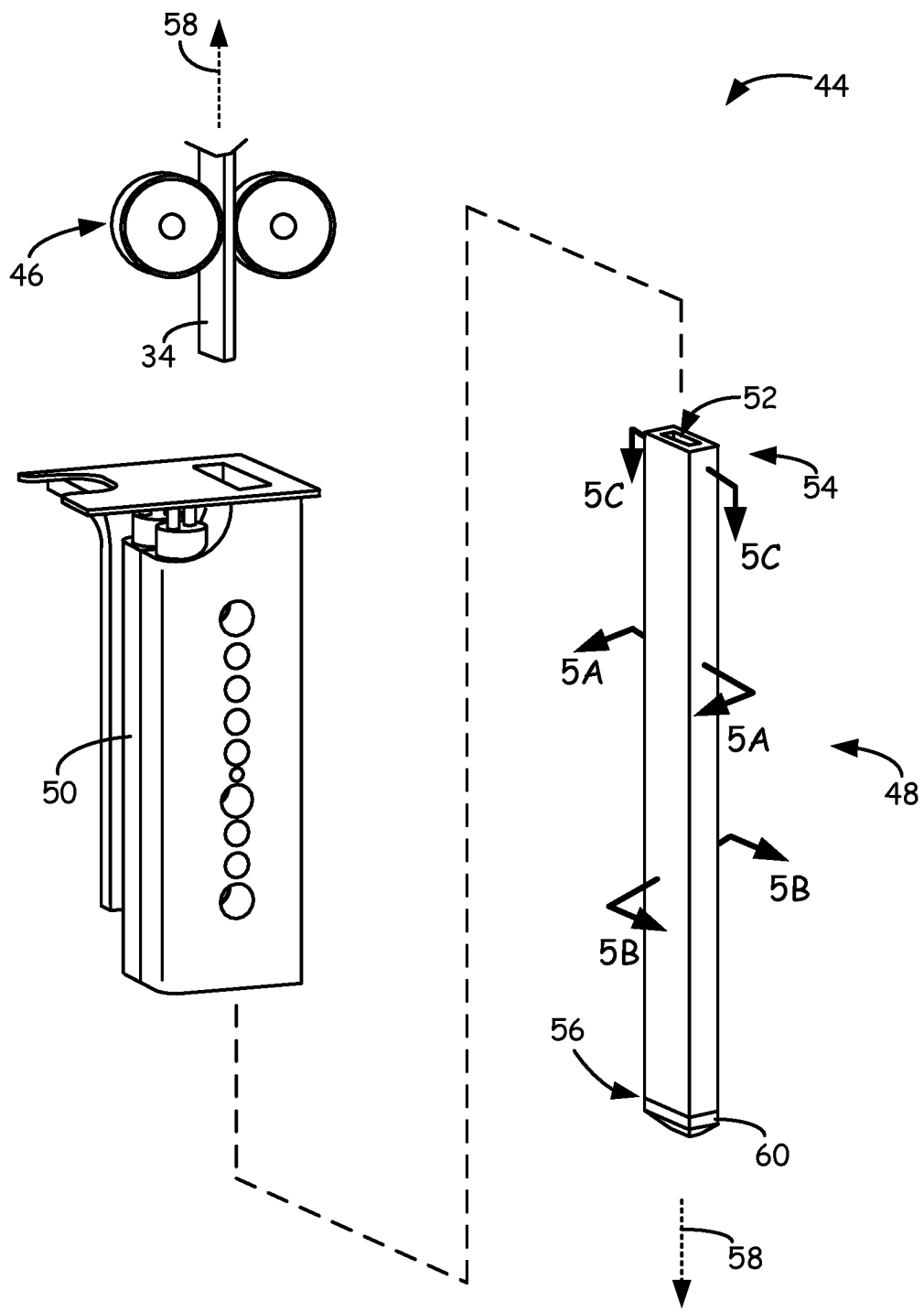
FIG. 4 is an exploded perspective view of an extrusion head subassembly of the extrusion-based digital manufacturing system in use with a ribbon filament, where the extrusion head subassembly includes a rectangular liquefier.

FIG. 4 is an exploded perspective view of subassembly 44, which is a suitable subassembly of extrusion head 18 (shown in FIG. 1) for use with ribbon filament 34. Subassembly 44 includes drive mechanism 46, liquefier 48, and thermal block 50. Drive mechanism 46 is a filament drive mechanism that feeds successive portions of ribbon filament 34 from pathway 30 (shown in FIG. 1) to liquefier 48. Drive mechanism 46 is desirably in signal communication with controller 28 (shown in FIG. 1), thereby allowing controller 28 to direct the rates at which drive mechanism 46 feeds ribbon filament 34 to liquefier 48. While shown as a pair of drive wheels, drive mechanism 46 may include a variety of different mechanisms for feeding ribbon filament 34 to liquefier 48. Examples of suitable filament drive mechanisms for drive mechanism 46 include those disclosed in Batchelder et al., U.S. Patent Application Publication Nos. 2009/0274540 and 2009/0273122.

Liquefier 48 is a non-cylindrical liquefier that includes channel 52 extending between top end 54 and bottom end 56. Top end 54 and bottom end 56 are opposing ends of liquefier 48 along longitudinal axis 58. Channel 52 is a rectangular slot in which ribbon filament 34 is received and melted. Accordingly, the inlet of channel 52 at top end 54 desirably has dimensions that allow ribbon filament 34 to mate with channel 52. This allows ribbon filament 34 to slide into channel 52 without undue frictional resistance. Channel 52 also desirably exhibits substantially the same cross-sectional profile along longitudinal axis 58 between top end 54 and bottom end 56. In alternative embodiments, however, the cross-sectional profile of channel 52 may taper down to a smaller cross-sectional area at bottom end 56.

Liquefier 48 also includes extrusion tip 60, which is a small-diameter tip that is located at a bottom end 56 and is configured to extrude the molten material of ribbon filament 34 with a desired road width. Examples of suitable inner tip diameters for extrusion tip 60 range from about 125 micrometers (about 0.005 inches) to about 510 micrometers (about 0.020 inches).

Thermal block 50 is a heat transfer component that extends around at least a portion of liquefier 48 and is configured to conduct heat to liquefier 48 and the received ribbon filament 34. Examples of suitable heat transfer components for thermal block 50 include those disclosed in Swanson et al., U.S. Pat. No. 6,004,124; Comb, U.S. Pat. No. 6,547,995; LaBossiere et al., U.S. Publication No.

2007/0228590; and Batchelder et al., U.S. Patent Application Publication No. 2009/0273122. In alternative embodiments, thermal block 50 may be replaced with a variety of different heat transfer components that generate and/or transfer heat to liquefier 48, thereby forming a thermal gradient within liquefier 48 along longitudinal axis 58.

During a build operation in system 10 (shown in FIG. 1), ribbon filament 34 is engaged with drive mechanism 46 and loaded into channel 52 of liquefier 48. Controller 28 then directs drive mechanism 46 drive successive portions of ribbon filament 34 through liquefier 48. As ribbon filament 34 passes through liquefier 48, the thermal gradient generated by thermal block 50 melts the material of ribbon filament 34 within liquefier 48. The upstream, unmelted portion of ribbon filament 34 being driven by drive mechanism 46 functions as a piston with a viscosity pump acting on the molten material between the unmelted portion and the walls of liquefier 48, thereby extruding the molten material out of extrusion tip 60. The extruded material may then be deposited as roads to form 3D model 24 in a layer-by-layer manner.

As discussed above, ribbon filament 34 is capable of being melted and extruded from liquefier 48 with reduced response times compared to cylindrical filaments melted and extruded from cylindrical liquefiers with the same volumetric flow rates. For cylindrical liquefiers, the response is dominated by RC-like lumped parameters. As such, the response time for cylindrical liquefiers refers to the 1/e time, which is the time for the flow rate to change from 0% to within about 63% of a new steady state value. In comparison, for non-cylindrical liquefiers such as liquefier 48, the response is dominated by transmission-line parameters. As such, the response time for non-cylindrical liquefiers such as liquefier 48 refers to the time between about the 10% and about the 90% flow rate changes.

For example, the response time of subassembly 44 is the time required for the flow rate of the molten material at extrusion tip 60 to respond to a change in the drive pressure that drive mechanism 46 applies to ribbon filament 34 (due to commands from controller 28). Low response times are helpful for improving the aesthetic and structural qualities of the resulting 3D model, particularly when building 3D models containing fine features. In particular, low response times are necessary for building 3D models at high speeds, since it determines the degree that a gantry (e.g., gantry 16) can slow down going into a corner and subsequently speed up as it leaves the corner.

The "volumetric flow rate" refers to the thermally-limited, maximum volumetric flow rate through a liquefier, which is the maximum volumetric flow rate of a material that a liquefier can liquefy to an extrudable state and then extrude. For a cylindrical liquefier, the thermally-limited, maximum volumetric flow rate $Q_{max,c}$ may be determined pursuant to Equation 1:

$$Q_{max,c} = 2 \pi \kappa L_{p,c}$$

where $\kappa$ is the thermal diffusivity of the material of a cylindrical filament, and $L_{p,c}$ is the length of the cylindrical liquefier containing molten material. Thus, based solely on this characteristic, the volumetric flow rate $Q_{max,c}$ can be increased merely by increasing the length of the cylindrical liquefier containing molten material.

However, in a cylindrical liquefier having a particular diameter, increasing the flow rate $Q_{max,c}$ also increases the flow resistance, which correspondingly increases the response time. The response time may be represented by a lumped, pressure change time constant $\tau_c$, which is the product of the flow resistance and the flow capacitance of the cylindrical liquefier and filament material. The flow resistance $FR_c$ for the cylindrical liquefier in pressure per (volume per second) may be determined pursuant to Equation 2:

$$FR_c = \frac{128 \eta L_{p,c}}{\pi d_c^4}$$

where $\eta$ is the dynamic viscosity of the material of the cylindrical filament, and $d_c$ is the inner diameter of the cylindrical liquefier. The flow capacitance $FC_c$ for the cylindrical liquefier may be determined pursuant to Equation 3:

$$FC_c = \frac{\pi \, d_c^2 \, L_{p,c}}{4 \, B}$$

where B is the bulk modulus of the filament material (i.e., the material's resistance to uniform compression).

By combining the flow resistance and the flow capacitance of the cylindrical liquefier, the response time for the cylindrical liquefier, based on a lumped, pressure change time constant $\tau_c$, may be determined pursuant to Equation 4:

$$\tau_c = \frac{32 \, \eta \, L_{p,c}^2}{B \, d_c^2}$$

Combining Equations 1 and 4 illustrates the proportional relationship between the time constant $\tau_c$ and the volumetric flow rate $Q_{max,c}$ for the cylindrical liquefier, which is shown in Equation 5:

$$\tau_c = \frac{8 \, \eta \, Q_{max,c}^2}{\pi^2 \, \kappa^2 B \, d_c^2}$$

As shown in Equation 5, increasing the volumetric flow rate of material correspondingly increases the response time, thereby undesirably increasing the time required for the pressure of the molten material at an extrusion tip to respond to a change in drive pressure on the cylindrical filament.

One potential technique for reducing the response time is to increase the diameters of the cylindrical filament and liquefier. However, cylindrical filaments having diameters greater than about 2.5 millimeters (about 0.1 inches) become difficult to handle and manage in an extrusion-based digital manufacturing system. As such, for a given volume in a cylindrical liquefier, an increase in the volumetric flow rate of the material undesirably increases the response time, and vice versa. These competing factors effectively limit the achievable response times and volumetric flow rates for cylindrical liquefiers.

Figure 5A:
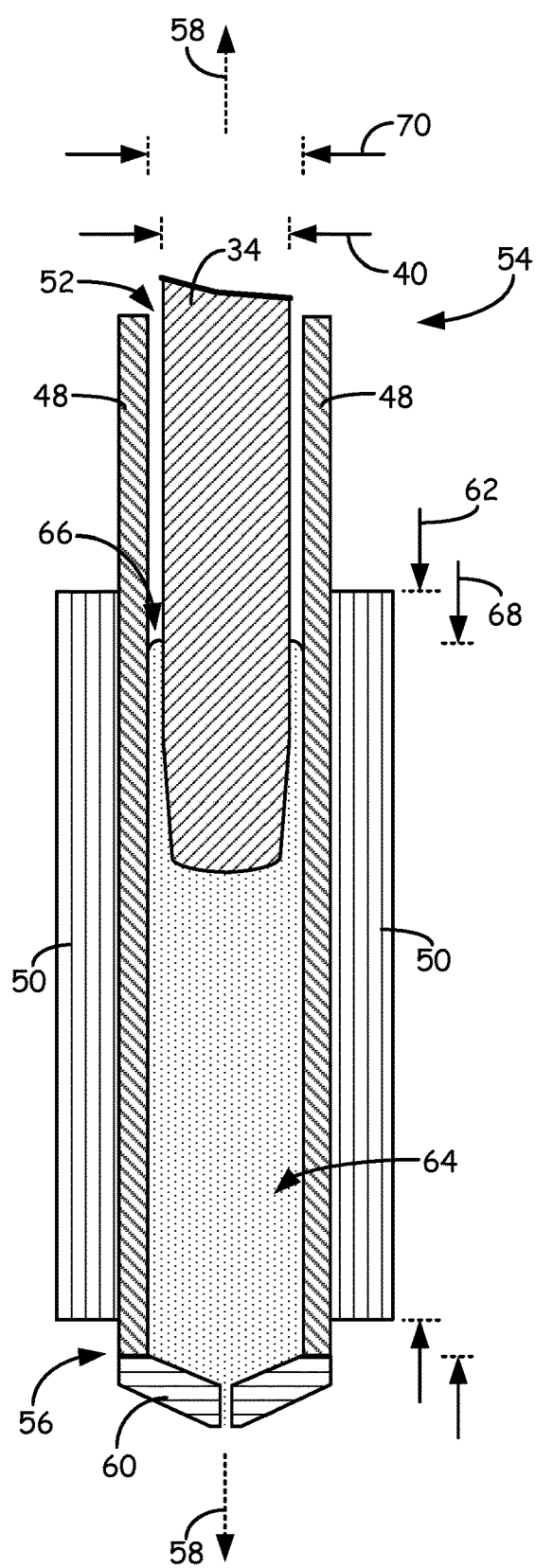
FIG. 5A is a sectional view of section 5A-5A taken in FIG. 4, illustrating the ribbon filament being extruded through the rectangular liquefier.
Figure 5B:
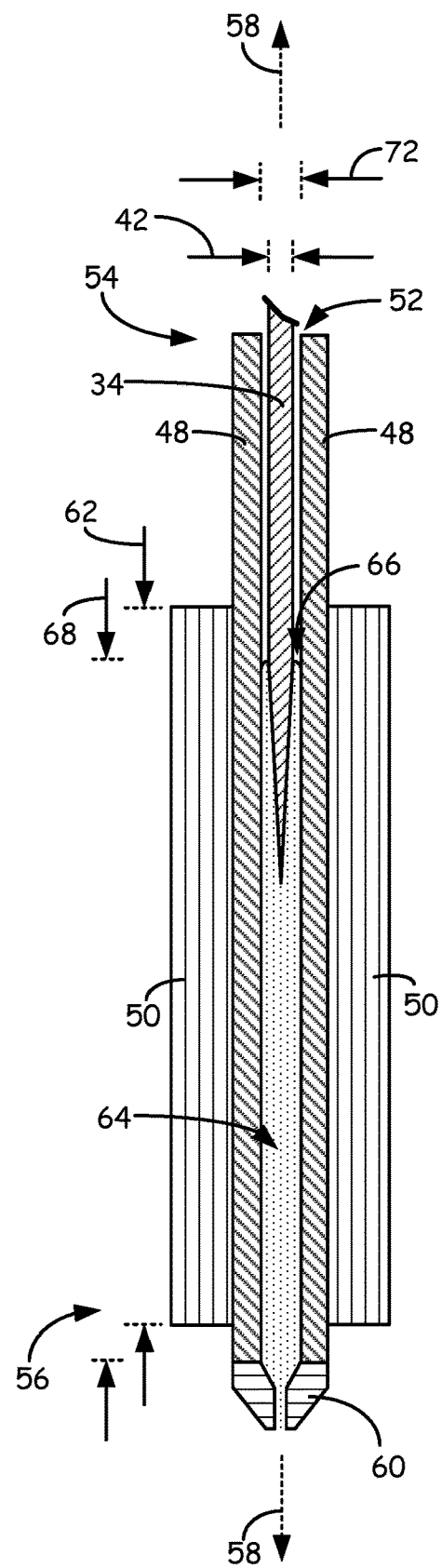
FIG. 5B is a sectional view of section 5B-5B taken in FIG. 4, further illustrating the ribbon filament being extruded through the rectangular liquefier.

FIGS. 5A and 5B are sectional views of sections 5A-5A and 5B-5B taken in FIG. 4, respectively, which illustrate ribbon filament 34 being melted in liquefier 48. As shown in FIG. 5A, thermal block 50 is configured to extend around and heat a portion of the length of liquefier 48 (referred to as heated length 62). Examples of suitable heated lengths 62 for liquefier 48 range from about 13 millimeters (about 0.5 inch) to about 130 millimeters (about 5.0 inches), with particularly suitable lengths 88 ranging from about 25 millimeters (about 1.0 inch) to about 51 millimeters (about 2.0 inches).

As ribbon filament 34 is driven into channel 52 of liquefier 48, successive portions of ribbon filament 34 are melted to at least an extrudable state to form melt pool 64 of the molten material in channel 52. As shown, melt pool 64 extends along axis 58 between bottom end 56 and meniscus 66. Accordingly, the length of liquefier 48 containing melt pool 64 along axis 58 (referred to as length 68) extends between bottom end 56 and meniscus 66. The location of meniscus 66 within liquefier 48 may vary depending on factors such as the thermal profile along liquefier 48, the dimensions of liquefier 48, the material of ribbon filament 34, the drive rate of ribbon filament 34, and the like. However, during steady state extrusion, meniscus 66 may be maintained at a substantially constant level such that length 68 of melt pool 64 is typically less than heated length 62.

Figure 5C:
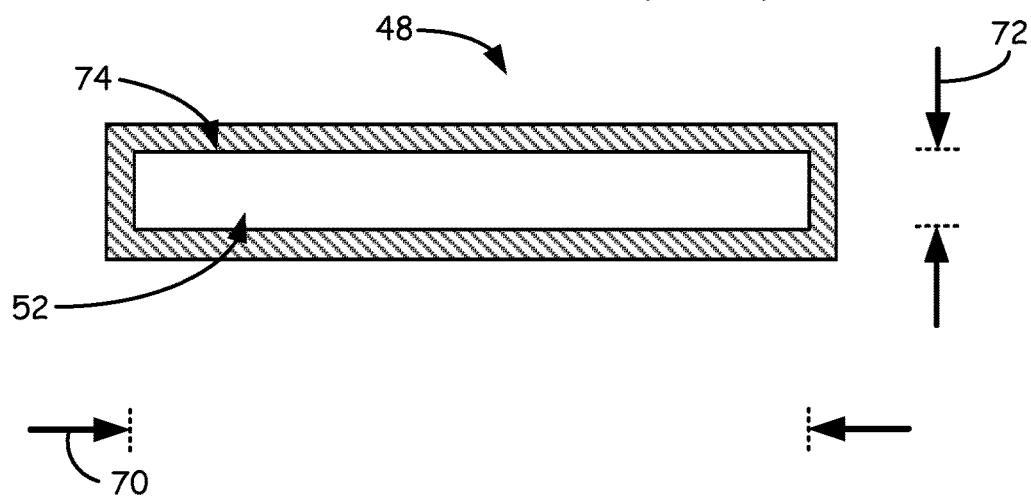
FIG. 5C is a sectional view of section 5C-5C taken in FIG. 4, illustrating an inlet cross-sectional profile of the rectangular liquefier.

As respectively shown in FIGS. 5A and 5B, channel 52 of liquefier 48 has a cross-sectional width (referred to as width 70) and a cross-sectional thickness (referred to as thickness 72), where width 70 is greater than thickness 72. This if further illustrated in FIG. 5C, which shows an inlet cross-sectional profile of channel 52 (referred to as channel profile 74). Suitable dimensions for width 70 and thickness 72 desirably allow ribbon filament 34 to mate with channel 52, as discussed above. As also discussed above, channel profile 74 also desirably exhibits substantially the same dimensions along heated length 62 of liquefier 48 (shown in FIGS. 5A and 5B). In alternative embodiments, however, channel profile 74 may taper down to a smaller cross-sectional area adjacent to bottom end 56 of liquefier 48 (shown in FIGS. 4, 5A, and 5B). In additional alternative embodiments, channel profile 74 may taper up to a larger cross-sectional area to provide stability to the meniscus position.

Suitable dimensions for width 70 and thickness 72 at channel profile 74 include widths the allow ribbon filament 34 to mate with channel 52 without undue friction. Examples of suitable dimensions for width 70 range from about 1.0 millimeter (about 0.04 inches) to about 12.7 millimeters (about 0.50 inches), with particularly suitable widths ranging from about 3.0 millimeters (about 0.12 inches) to about 10.1 millimeters (about 0.40 inches), and with even more particularly suitable widths ranging from about 3.8 millimeters (about 0.15 inches) to about 6.4 millimeters (about 0.25 inches).

Examples of suitable dimensions for thickness 72 range from about 0.25 millimeters (about 0.01 inches) to about 2.5 millimeters (about 0.10 inches), with particularly suitable thicknesses ranging from about 0.51 millimeters (about 0.02 inches) to about 2.0 millimeters (about 0.08 inches), and with even more particularly suitable thicknesses ranging from about 0.76 millimeters (about 0.03 inches) to about 1.8 millimeters (about 0.07 inches).

While not wishing to be bound by theory, it is believed that the aspect ratio of channel profile 74 effectively removes the core that is associated with a cylindrical filament having a circular cross-section. This allows liquefier 48 to achieve reduced response times compared to a cylindrical liquefier having the same wetted channel volume (e.g., the volume of channel 52, which is the area of channel profile 74 taken along length 68, shown in FIGS. 5A and 5B). Ignoring the heat diffusing from the edges of ribbon filament 34, assuming that width 70 is large compared to thickness 72, the time-dependant temperature profile of ribbon filament 34 may be determined pursuant to Equation 6:

$$Temp(x,t) = Temp_a + (Temp_f - Temp_a) \sum_{n=0}^{\infty} (-1)^n \left\{ \begin{array}{l} \mathrm{erfc}\left(\frac{(2n+1)T_f - 2x}{4\sqrt{\kappa t}}\right) + \\ \mathrm{erfc}\left(\frac{(2n+1)T_f + 2x}{4\sqrt{\kappa t}}\right) \end{array} \right\}$$

where $Temp_a$ is an initial temperature of ribbon filament 34 prior to being heated in liquefier 48, $Temp_f$ is the temperature of liquefier 48, $T_f$ is the thickness of ribbon filament 34 (i.e., thickness 42), where $-T_f < 2x < T_f$, and where erfc is the complimentary error function as shown in Equation 7:

$$\mathrm{erfc}(x) = \frac{2}{\pi}\int_x^{\infty} \exp(-t^2)dt$$

The complimentary error function has an asymptotic expansion as shown in Equation 8:

$$\mathrm{erfc}(x) = \frac{e^{-x^2}}{x\sqrt{\pi}}\left[1 + \sum_{n=0}^{\infty}(-1)^n \frac{1,3,5,\ldots(2n-1)}{(2x^2)^n}\right]$$

From Equation 8, the characteristic lowest-order time constant can be extracted, which may be represented by Equation 9:

$$\tau_f = \frac{T_f^2}{16\kappa}$$

Incorporating the first one-hundred terms of the asymptotic expansion in Equation 8, using a thermal diffusivity $\kappa$ of 8.13 millimeters/second$^2$ (0.320 inches/second$^2$) (a suitable value for ABS materials), a thickness $T_f$ of ribbon filament 34 (i.e., thickness 42) of 0.76 millimeters (0.03 inches), an initial temperature $Temp_a$ of 80° C., and a wall temperature $Temp_f$ of liquefier 48 of 320° C., a reasonable time for the average temperature to move half-way to the asymptotic temperature, as represented by the lowest-order time constant $\tau_f$, is about 0.24 seconds. Accordingly, a reasonable estimate for the time required to heat ribbon filament 34 is about four times the lowest-order time constant $\tau_f$ (i.e., $4\tau_f$). Thus, this process produces a volume of the molten material in $4\tau_f$ seconds as determined pursuant to Equation 10:

$$Q(4\tau_f) = (W_r)(T_r)(L_{p,r})$$

where $W_r$ is the width of channel 52 (i.e., width 70), $T_r$ is the thickness of channel 52 (i.e., thickness 72), and $L_{p,r}$ is the length of channel 52 containing molten material (i.e., length 68).

Accordingly, for a rectangular liquefier (e.g., liquefier 48), the thermally-limited, volumetric flow rate $Q_{max,r}$ may be determined pursuant to Equation 11:

$$Q_{max,r} = 4\kappa L_{p,r}\frac{W_r}{T_r}$$

As shown in Equation 11, the thermally-limited, maximum volumetric flow rate $Q_{max,r}$ is governed by the length of liquefier 48 containing the molten material (i.e., length 68). Thus, the operative length is the heated length of ribbon filament 34 rather than the heated length of the liquefier (e.g., heated length 62).

As discussed above for the cylindrical liquefier, the response time for a rectangular liquefier (e.g., liquefier 48) is also the product of the flow resistance and the flow capacitance of the rectangular liquefier and ribbon filament material. The flow resistance $FR_r$ for the rectangular liquefier may be determined pursuant to Equation 12:

$$FR_r = \frac{12 \, \eta \, L_{p,r}}{W_r \, T_r^3}$$

The flow capacitance $FC_r$ for the rectangular liquefier may be determined pursuant to Equation 13:

$$FC_r = \frac{W_r \, T_r \, L_{p,r}}{B}$$

By combining the flow resistance and the flow capacitance of the rectangular liquefier, the response time $\tau_r$ for the rectangular liquefier may be determined pursuant to Equation 14:

$$\tau_r = \frac{12 \, \eta \, L_{p,r}^2}{B \, T_r^2}$$

Combining Equations 11 and 14 illustrates the proportional relationship between the response time $\tau_r$ and the volumetric flow rate $Q_{max,r}$ for the rectangular liquefier, which is shown in Equation 15:

$$\tau_r = \frac{3 \, \eta \, Q_{max,r}^2}{4 \, \kappa^2 B \, W_r^2}$$

A comparison of Equations 5 and 15 shows that, for the same thermally-limited, maximum volumetric flow rates (i.e., $Q_{max,c} = Q_{max,r}$), when width 40 of ribbon filament 34 is greater than thickness 42 of ribbon filament 34, the response time for controlling the extrusion of ribbon filament 34 in liquefier 48 is less than the response time for a cylindrical filament in a cylindrical liquefier. For the same thermally-limited, maximum volumetric flow rates (i.e., $Q_{max,c} = Q_{max,r}$), the aspect ratio of profile 38 of ribbon filament 34 and channel profile 74 of channel 52 desirably provides a response time that is at least 1.5 times faster than a response time achievable with a cylindrical liquefier having a circular cross-sectional profile. More desirably, the response time is at least two times faster, and even more desirably is at least three times faster. Accordingly, examples of suitable aspect ratios of width 40 to thickness 42 include aspect ratios of about 2:1 or greater, with particularly suitable aspect ratios ranging from about 2.5:1 to about 20:1, with even more particularly suitable aspect ratios ranging from about 3:1 to about 10:1, and with even more particularly suitable aspect ratios ranging from about 3:1 to about 8:1.

Figure 6:
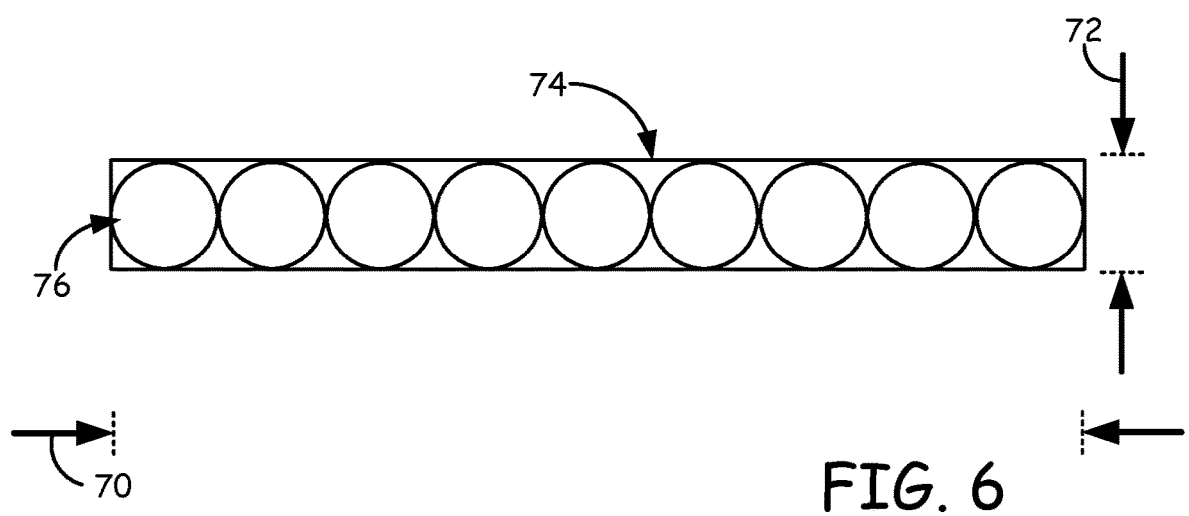
FIG. 6 is a schematic illustration of a plurality of cylindrical liquefiers superimposed over a rectangular liquefier.

The comparison of Equations 5 and 15 may be visualized by superimposing multiple cylindrical liquefiers in an array to form a slot comparable to channel profile 74 of channel 52, as shown in FIG. 6. This results in the same cross-sectional areas for the cylindrical liquefiers (referred to as cylindrical liquefiers 76) and channel profile 74, ignoring the interstitial spaces between cylindrical liquefiers 76. Accordingly, in this example, the diameter of each cylindrical liquefier 76 is the same as thickness 72. It is also assumed that the lengths of each cylindrical liquefier 76 containing molten material is the same as length 68 of melt pool 64. As such the combined wetted volumes of cylindrical liquefiers 76 is the same as the wetted volume of liquefier 48.

The ratio of the response time of the cylindrical liquefier to the response time of liquefier 48 $\tau_r/\tau_r$ is shown in Equation 16:

$$\frac{\tau_r}{\tau_c} = \frac{3 \, \pi^2 \, d_c^2}{32 \, W_r^2} = 0.93 \frac{d_c^2}{W_r^2}$$

Thus, as shown in Equation 16, for the same thermally-limited, maximum volumetric flow rates (i.e., $Q_{max,c} = Q_{max,r}$), the ratio of the response time of the cylindrical liquefier to the response time of liquefier 48 is proportional to the diameter of the cylindrical liquefier squared over thickness 72 of channel 52 squared. For example, a cylindrical liquefier having a diameter of 1.78 millimeters (0.070 inches) and liquefier 48 having width 70 of 3.05 millimeters (0.120 inches) and thickness 72 of 0.813 millimeters (0.032 inches) (i.e., an aspect ratio of about 4:1) have substantially the same cross-sectional areas. Thus, for these cross-sectional areas, and the same melt pool lengths (e.g., length 68), and $Q_{max,c} = Q_{max,r}$, pursuant to Equation 16, the response time ratio $\tau_r/\tau_c = 0.32$. In other words, the response time for liquefier 48 with ribbon filament 34 is about three times faster than the response time achievable with the cylindrical liquefier and the cylindrical filament.

In another example, a cylindrical liquefier having a diameter of 1.78 millimeters (0.070 inches) and liquefier 48 having width 70 of 4.19 millimeters (0.165 inches) and thickness 72 of 0.584 millimeters (0.023 inches) (i.e., an aspect ratio of about 7:1) also have substantially the same cross-sectional areas. Thus, for these cross-sectional areas, and the same molten lengths, and $Q_{max,c} = Q_{max,r}$, pursuant to Equation 16, the response time ratio $\tau_r/\tau_c = 0.167$. In other words, in this example, the response time for liquefier 48 and ribbon filament 34 is about six times faster than the response time achievable with the cylindrical liquefier and the cylindrical filament. This illustrates that as the aspect ratios of ribbon filament 34 and channel 52 increase, the response times also increase.

While again not wishing to be bound by theory, it is believed that this reduction in response time is due to the fact that the array of cylindrical liquefiers contain additional wall sections that effectively form webs in the cross-sectional area of rectangular liquefier 48, thereby increasing frictional resistance. This increased frictional resistance is not found in channel profile 74. As such, for a given thermally-limited, maximum volumetric flow rate, liquefier 48 is capable of receiving, melting, and extruding ribbon filament 34 with a reduced response time compared to a cylindrical liquefier and a cylindrical filament.

The above-discussed embodiments were directed to a non-cylindrical filament having a rectangular cross-sectional profile (i.e., ribbon filament 34), and a non-cylindrical liquefier having a corresponding rectangular channel (i.e., liquefier 48). The cross-sectional profiles of these embodiments may be properly characterized by cross-sectional aspect ratios of width to thickness (e.g., width 40 to thickness 42 of ribbon filament 34, and width 70 to thickness 72 of channel 52). However, many non-cylindrical filaments and liquefiers may have cross-sectional profiles that cannot be properly characterized by cross-sectional aspect ratios of width to thickness. As such, an alternative manner for properly characterizing the cross-sectional profiles of non-cylindrical filaments and liquefiers may be made with a hydraulic diameter $D_h$, as represented by Equation 17:

$$D_h = \frac{4A_e}{U}$$

where $A_e$ is the area of the cross-sectional profile at the entrance of the liquefier channel, and U is the wetted perimeter of the liquefier channel.

For a cylindrical liquefier, Equation 17 reduces to $D_h = D_c$. For a rectangular liquefier such as liquefier 48, where channel 52 is substantially filled with the molten material, $A_e = W_r T_r$, and $U = 2(W_r + T_r)$, and the hydraulic diameter $D_h$ may be represented by Equation 18:

$$D_h = \frac{2\ W_r\ T_r}{W_r + T_r}$$

Accordingly, suitable cross-sectional profiles for non-cylindrical filaments and liquefiers of the present disclosure desirably have hydraulic diameters $D_h$ that are represented by Equation 19:

$$D_h < P_1 \sqrt{A_e}$$

where $P_1$ is a percentage value such that $D_h$ is less than percentage $P_1$ of $\sqrt{A_e}$. Examples of suitable values for percentage $P_1$ include about 0.95 (i.e., $D_h < 0.95\sqrt{A_e}$), with particularly suitable values percentage $P_1$ including about 0.90 (i.e., $D_h < 0.90\sqrt{A_e}$), and with even more particularly suitable values percentage $P_1$ including about 0.87 (i.e., $D_h < 0.87\sqrt{A_e}$).

Equation 19 illustrates suitable upper limits for the hydraulic diameters $D_h$ of the non-cylindrical filaments and liquefiers of the present disclosure. Accordingly, the suitable cross-sectional profiles for non-cylindrical filaments and liquefiers of the present disclosure also desirably have hydraulic diameters $D_h$ that are represented by Equation 20:

$$D_h > P_2 \sqrt{A_e}$$

where $P_2$ is a percentage value such that $D_h$ is greater than percentage $P_2$ of $\sqrt{A_e}$. Examples of suitable values for percentage $P_2$ include about 0.40 (i.e., $D_h > 0.40\sqrt{A_e}$), with particularly suitable values percentage $P_2$ including about 0.55 (i.e., $D_h > 0.55\sqrt{A_e}$), and with even more particularly suitable values percentage $P_2$ including about 0.70 (i.e., $D_h > 0.70\sqrt{A_e}$). Thus, the hydraulic diameters $D_h$ of the non-cylindrical filaments and liquefiers of the present disclosure desirably meet the criteria of Equation 19, desirably meet the criteria of Equation 20, and even more desirably meet the criteria of Equation 19 and of Equation 20. These values correspond to the above-discussed suitable cross-sectional aspect ratios for a rectangular liquefier such as liquefier 48.

In comparison, cylindrical filaments and liquefiers require $P_1$ and $P_2$ to each be about 2.25.

Figure 7:
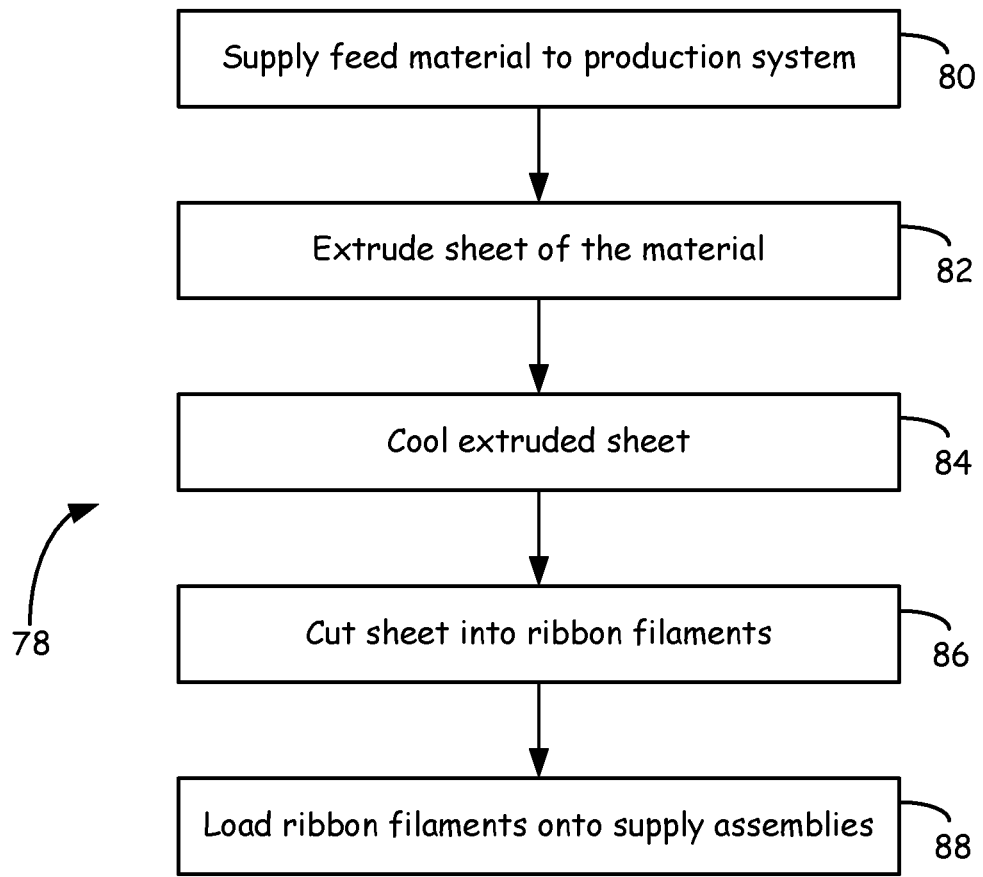
FIG. 7 is a flow diagram of a method of forming ribbon filaments.

FIGS. 7-11 illustrate suitable embodiments for manufacturing non-cylindrical filaments, such as ribbon filament 34 (shown in FIGS. 2-4), prior to use in extrusion-based digital manufacturing systems (e.g., system 10, shown in FIG. 1). FIG. 7 is a flow diagram of method 78, which is an example of a suitable method for manufacturing non-cylindrical filaments, such as ribbon filament 34. As shown, method 78 includes steps 80-88, and initially involves supplying a feed material to a sheet extrusion system (step 80). The feed material may be supplied to the production system in a variety of different media, such as pellets, rods, powders, particulates, blocks, ingots, and the like. Suitable compositions for the feed materials include those discussed above for the modeling and support materials of ribbon filament 34.

Upon being supplied to the sheet extrusion system, the feed material may be melted and extruded to produce an extruded sheet of the feed material (step 82). As discussed below, the extruded sheet may subsequently be used and separated into a plurality of individual ribbon filaments, where the thickness of the extruded sheet in a solid state desirably matches the thickness of each of the ribbon filaments. After being extruded, the extruded sheet is desirably cooled to at least partially solidify the extruded sheet (step 84). In some embodiments, as discussed below, the sheet may also be laminated with additional sheets of different materials to form a multi-layer sheet.

At this point in the process, the sheet may be stored (e.g., wound up on a take-up spool) for subsequent separation or directly fed to a sheet cutter, such as in a continuous process. At the sheet cutter, the sheet may be cut longitudinally into the plurality of ribbon filaments, where the cross-sectional profile of at least one of the ribbon filaments is desirably configured to mate with a non-cylindrical liquefier (e.g., liquefier 48), as discussed above (step 86). More desirably, each of the ribbon filaments cut from the extruded sheet are configured to mate with a non-cylindrical liquefier (e.g., liquefier 48).

After being cut, the ribbon filaments may then be loaded onto supply assemblies (step 88). In one embodiment, the loading process for the plurality of ribbon filaments may be performed in a substantially parallel manner, where after being cut from the extruded sheet, the ribbon filaments are fed onto multiple take-up spools in a substantially continuous manner. The supply assemblies may then be used in one or more extrusion-based digital manufacturing systems (e.g., system 10) for building 3D models and support structures.

Figure 8:
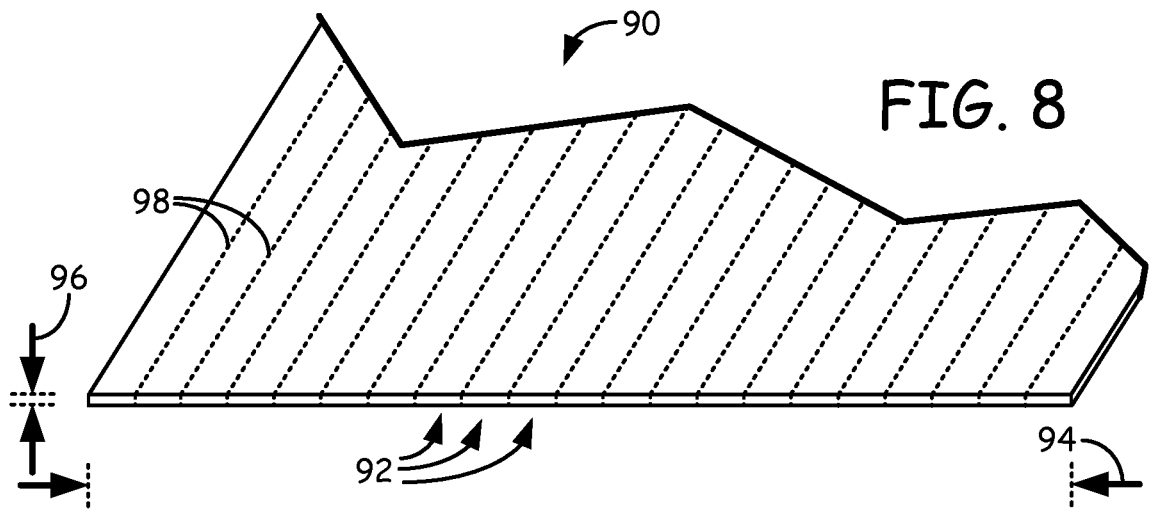
FIG. 8 is a perspective view of an extruded sheet used to form ribbon filaments.

FIG. 8 is a perspective view of sheet 90, which is an example of an extruded sheet that may be produced pursuant to steps 80, 82, and 84 of method 78 (shown in FIG. 7). As shown in FIG. 8, sheet 90 may be cut into a plurality of ribbon filaments 92, where each ribbon filament 92 desirably corresponds to ribbon filament 34 (shown in FIGS. 2-4). The number of ribbon filaments 92 that may be produced from a single sheet 90 may vary depending on the width of sheet 90 (referred to as sheet width 94). Examples of suitable numbers of ribbon filaments 92 that may be extruded from a single sheet 90 range from about five to about one hundred, with particularly suitable numbers ranging from about ten to about fifty.

Sheet width 94 of sheet 90 desirably minimizes the amount of wasted material. As such, cut ribbon filaments 92 desirably extend across the entire sheet width 94. In alternative embodiments, however, one or more portions along the sheet width 94 of sheet 90 may be discarded or recycled. For example, the lateral edge portions of the width of sheet

90 may be discarded or recycled, as desired. Examples of suitable dimensions for sheet width 94 range from about 0.3 meters (about 1.0 foot) to about 1.2 meters (about 4.0 feet) with particularly suitable widths ranging from about 0.46 meters (about 1.5 feet) to about 0.91 meters (about 3.0 feet).

Additionally, sheet 90, in a solidified state, desirably has a sheet thickness (referred to as sheet thickness 96) that is substantially the same as the desired thicknesses of ribbon filaments 92 (e.g., thickness 42 of ribbon filament 34). Examples of suitable dimensions for sheet thickness 96 range from about 0.08 millimeters (about 0.003 inches) to about 1.5 millimeters (about 0.06 inches), with particularly suitable thicknesses ranging from about 0.38 millimeters (about 0.015 inches) to about 1.3 millimeters (about 0.05 inches), and with even more particularly suitable thicknesses ranging from about 0.51 millimeters (about 0.02 inches) to about 1.0 millimeters (about 0.04 inches).

After being extruded and at least partially solidified, sheet 90 may then be cut into ribbon filaments 92, pursuant to step 86 of method 78. This is illustrated in FIG. 8 with a cut line 98 located between each ribbon filament 92. After being cut from extrusion sheet 90, each ribbon filament 92 may then be loaded onto a supply assembly (e.g., a spool), pursuant to step 88 of method 78. This process allows multiple ribbon filaments 92 to be fabricated from a single extruded sheet 90 without requiring additional resizing steps to attain the desired thicknesses for ribbon filaments 92. This correspondingly allows high production rates to be achieved.

Figure 9:
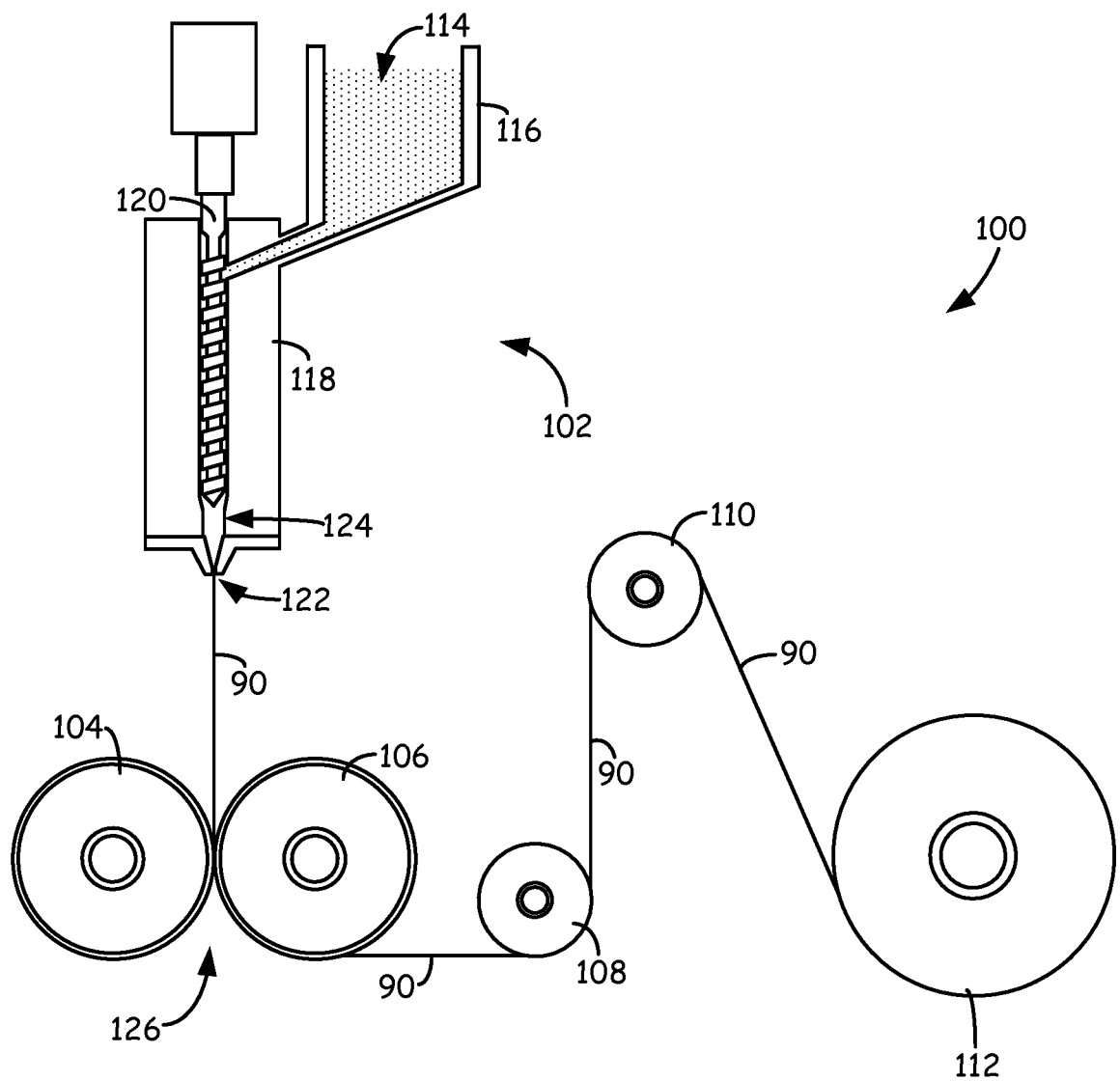
FIG. 9 is a schematic illustration of a sheet extrusion system for forming the extruded sheet.

FIG. 9 is a schematic illustration of sheet extrusion system 100, which is an example of a suitable system for producing extruded sheets (e.g., sheet 90, shown in FIG. 8) pursuant to method 78 (shown in FIG. 7). As shown, system 100 includes extrusion assembly 102, cooling drums 104 and 106, pulleys 108 and 110, and take-up spool 112. Extrusion assembly 102 is configured to receive and extrude a feed material of the desired modeling and/or support material (shown as media 114), to produce sheet 90. Extrusion assembly 102 includes hopper 116, thermal sleeve 118, drive screw 120 and extrusion outlet 122. While show in a vertical orientation, extrusion assembly 102 (and system 100) may alternatively be positioned in different orientations (e.g., a horizontal orientation). During operation, drive screw 120 feeds successive portions of media 114 from hopper 116 to an extrusion shaft defined by thermal sleeve 118 (referred to as extrusion shaft 124). Thermal sleeve 118 transfers thermal energy to media 114 as media 114 is fed into extrusion shaft 122, thereby melting and extruding media 114 out of extrusion outlet 122 to produce sheet 90.

Sheet 90 may then engage cooling drums 104 and 106 to define the thickness of sheet 90 (i.e., sheet thickness 96). Cooling drums 104 and 106 are cylindrical drums that are desirably maintained at reduced temperatures to cool sheet 90 as sheet 90 engages with cooling drums 104 and 106 at nip 126. The reduced temperatures for cooling drums 104 and 106 may vary depending on factors such as the line speed of sheet 90, the composition and dimensions of sheet 90, and the like. Examples of suitable temperatures for cooling drums 104 and 106 range from about 40° C. to about 60° C. This allows sheet 90 to at least partially solidify to a solid state while maintaining sheet thickness 96 after passing through nip 126.

Accordingly, cooling drum 104 is desirably offset from cooling drum 106 at nip 126 at a distance that sets sheet thickness 96 for sheet 90. As a result, the thicknesses of successive portions of sheet 90 may match the desired thickness of each ribbon filament 92 that will be cut from sheet 90. This allows each ribbon filament 92 to subsequently mate with a corresponding non-cylindrical liquefier (e.g., liquefier 48) to attain reduced response times, as discussed above. In one embodiment, system 100 may also include a sensor assembly (not shown) configured to detect and measure the sheet thickness of sheet 90 in real time, and to adjust one or more processing parameters to achieve the desired sheet thickness (e.g., adjusting line speeds, nip dimensions, and the like).

In one embodiment, topographical surface patterns may be formed in sheet 90 to provide ribbon filaments 92 having topographical surface patterns as disclosed in Batchelder et al., U.S. Patent Application Publication No. 2011/0076495. In this embodiment, one or both of cooling drums 104 and 106 may include a textured outer surface configured to form the topographical surface patterns in sheet 90 when sheet 90. This is beneficial for forming the topographical surface patterns prior to sheet 90 fully solidifying. Alternatively, the patterns in sheet 90 may be formed with the use of additional rollers having textured surfaces, where the additional rollers may be located upstream or downstream from cooling drums 104 and 106.

In an additional embodiment, system 100 may include one or more coating units (not shown) to apply a coating on one or both major surfaces of sheet 90. For example, system 100 may include a corona discharge unit (not shown) configured to deposit thin coatings of a material on either or both major surfaces of sheet 90. This allows a variety of coating materials to be deposited on sheet 90, such as low-surface energy materials. Low-surface energy materials may be beneficial for reducing frictional resistance as ribbon filaments 92 are driven into rectangular liquefiers (e.g., liquefier 48) of extrusion-based digital manufacturing systems (e.g., system 10).

Sheet 90 may then wind around pulleys 108 and 110, and be wound up on take-up spool 112, where one or more of cooling drums 104 and 106, pulleys 108 and 110, and take-up spool 112 may be motor drive to apply a suitable line speed for forming sheet 90. Examples of suitable line speeds for forming sheet 90 range from about 1 meter/minute to about 20 meters/minute, with particularly suitable line speeds ranging from about 5 meters/minute to about 15 meters/minute. In alternative embodiments, additional numbers of pulleys may be used to direct sheet 90 to take-up spool 112. After a suitable length of sheet 90 is wound up on take-up spool 112, sheet 90 may be separated and take-up spool 112 may be stored or set up for subsequent processing to cut sheet 90 into separate ribbon filaments 92, as discussed below. In an alternative embodiment, sheet 90 may be fed directly to a cutting unit to cut sheet 90 into separate ribbon filaments 92. In this embodiment, take-up spool 112 may be omitted and sheet 90 may be cut into ribbon filaments 92 in a continuous process with the extrusion and forming of successive portions of sheet 90.

Figure 10:
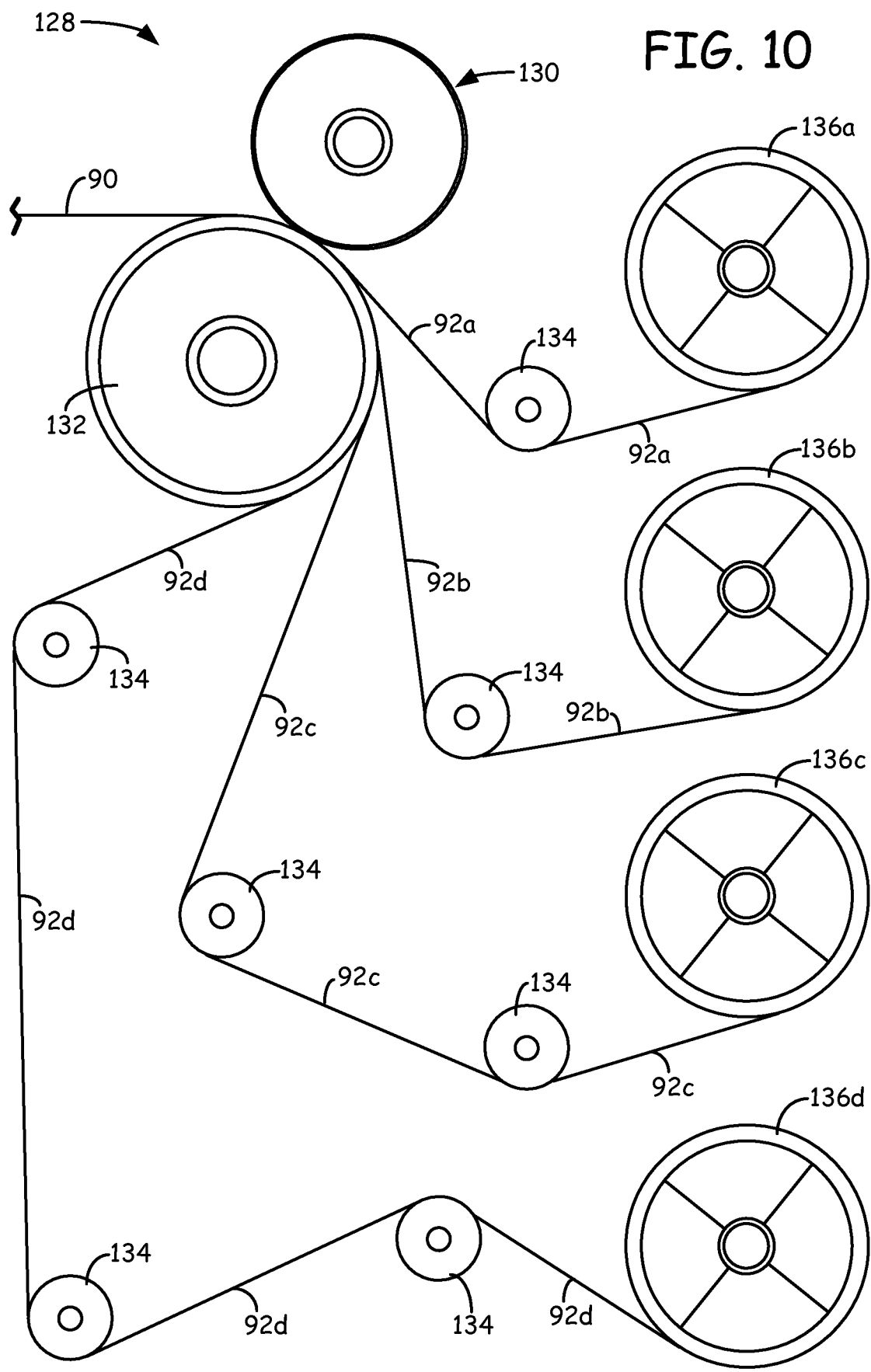
FIG. 10 is a schematic illustration of a filament-production system for forming ribbon filaments from extruded sheets.

FIG. 10 is a schematic illustration of filament-production system 128, which is a suitable system for forming ribbon filaments 92 from sheet 90. System 128 includes cutting roller 130, backing roller 132, idler pulleys 134, and take-up spools 136*a*-136*d*. As shown, sheet 90 may be supplied to the nip intersection of cutting roller 130 and backing roller 132 from a take-up spool (e.g., take-up spool 112) or as a direct feed from system 100 for a continuous process.

Cutting roller 130 is a first roller that includes a cylindrical surface having a plurality of parallel thin blades configured to cut successive portions of sheet 90 into separate ribbon filaments (referred to as ribbon filaments 92*a*-92*d*). Accordingly, the parallel blades of cutting roller 130 are desirably separated by gaps that account for the widths of ribbon filaments 92 (e.g., width 40 of ribbon filament 34, shown in FIG. 3). Cutting roller 130 is also desirably motor driven to pull sheet 90 between cutting roller 130 and backing roller 132 during the cutting operation. Backing roller 132 is a second roller that is spaced apart from cutting roller 130 by a suitable distance to allow sheet 90 to pass between cutting roller 130 and backing roller 132 and engage with the bladed surface of cutting roller 130.

After being cut from sheet 90, each ribbon filament 92 (e.g., ribbon filaments 92a-92d) is desirably fed to a separate spool of take-up spools 136a-136d. Take-up spool 136a-136d are examples of suitable supply assemblies for supply spool 20 and/or supply spool 22 (shown in FIG. 1). Ribbon filaments 92a-92d may be directed to the respective take-up spools 136a-136d with idler pulleys 134. As shown, idler pulleys 134 are positioned to allow ribbon filaments 92a-92d to exit backing roller 132 at different radial locations. This reduces the risk of ribbon filaments 92a-92d from becoming entangled while being loaded to take-up spools 136a-136d.

Each of take-up spools 136a-136d may also be motor driven to respectively wind up ribbon filaments 92a-92d as they are cut from sheet 90. While system 128 is illustrated with four ribbon filaments 92 and four take-up spools 136, cutting roller 130 may cut sheet 90 into any suitable number of ribbon filaments 92, based on the widths of sheet 90 and ribbon filaments 92. The cut ribbon filament 92 may then be loaded onto individual take-up spools 136 in a substantially parallel manner.

While system 128 is shown with a single cutting roller 130/backing roller 132 pair, in alternative embodiments, system 128 may include multiple pairs of cutting rollers/backing rollers. For example, system 128 may include an initial pair of cutting roller 130 and backing roller 132, which may cut sheet 90 into multiple segments, where each segment has a width that includes multiple ribbon filaments 92. Each cut segment may then pass through an additional pair of cutting roller 130 and backing roller 132, which may cut the given segment into the separate ribbon filaments 92. The separate ribbon filaments 92 may then be loaded onto separate take-up spools 136, as discussed above. Thus, sheet 90 may be cut into ribbon filaments 92 during a single cutting step or in multiple successive cutting steps.

Sheet extrusion system 100 and filament-production system 128 are each desirably contained within a housing (not shown) to achieve a dry environment. For example, systems 100 and 128 may each include a dry air circulator and/or desiccant packages to maintain the low moisture content. Furthermore, take-up spools 112 and 136 may each also include desiccant packages to keep the received sheet 90/ribbon filament 92 dry during storage and subsequent use. Suitable techniques for maintaining dry environments in systems 100 and 128, and in take-up spools 112 and 136 include those disclosed in Swanson et al., U.S. Pat. No. 6,923,634; Comb et al., U.S. Pat. No. 7,122,246; and Taatjes et al, U.S. Patent Application Publication Nos. 2010/0096489 and 2010/0096485.

Figure 11:
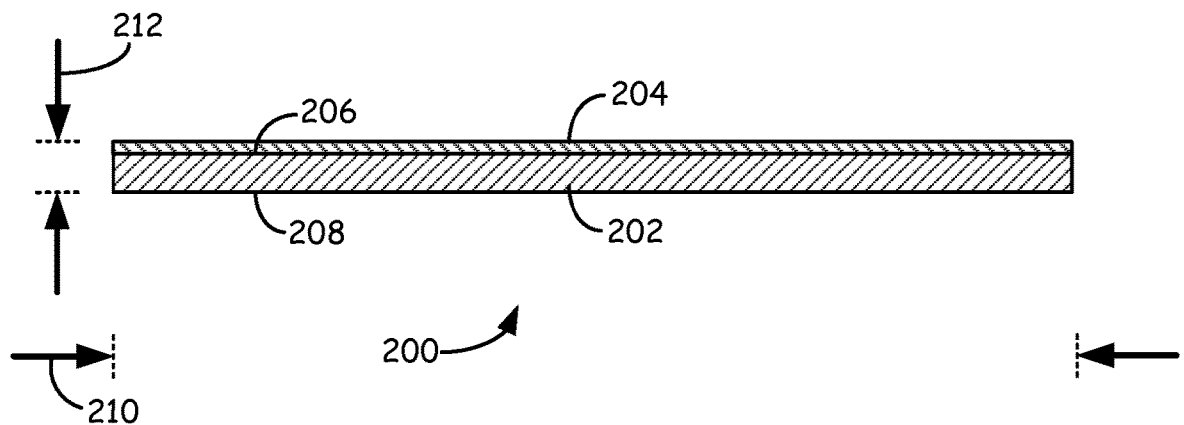
FIG. 11 is an alternative sectional view of section 3-3 taken in FIG. 2, illustrating a first alternative ribbon filament having a single laminated surface.
Figure 12:
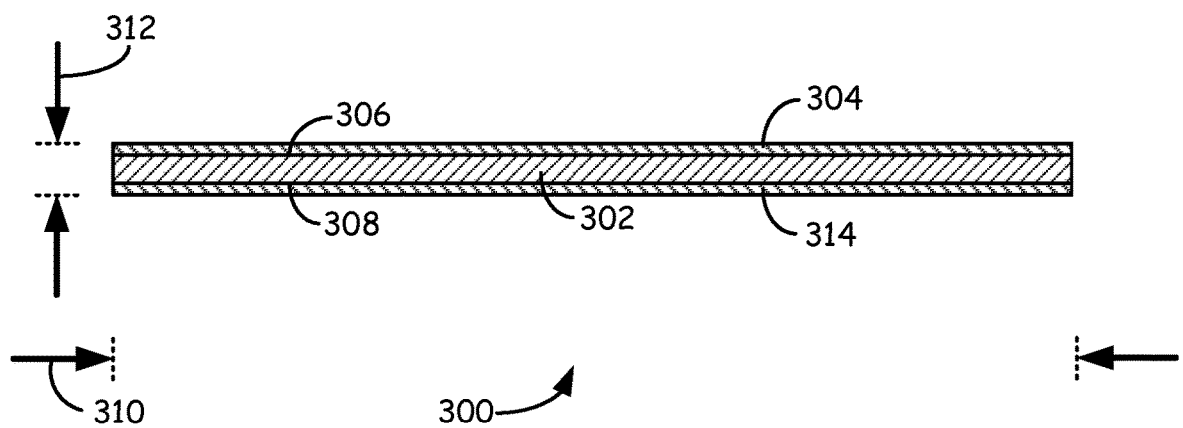
FIG. 12 is an alternative sectional view of section 3-3 taken in FIG. 2, illustrating a second alternative ribbon filament having two laminated surfaces.
Figure 13:
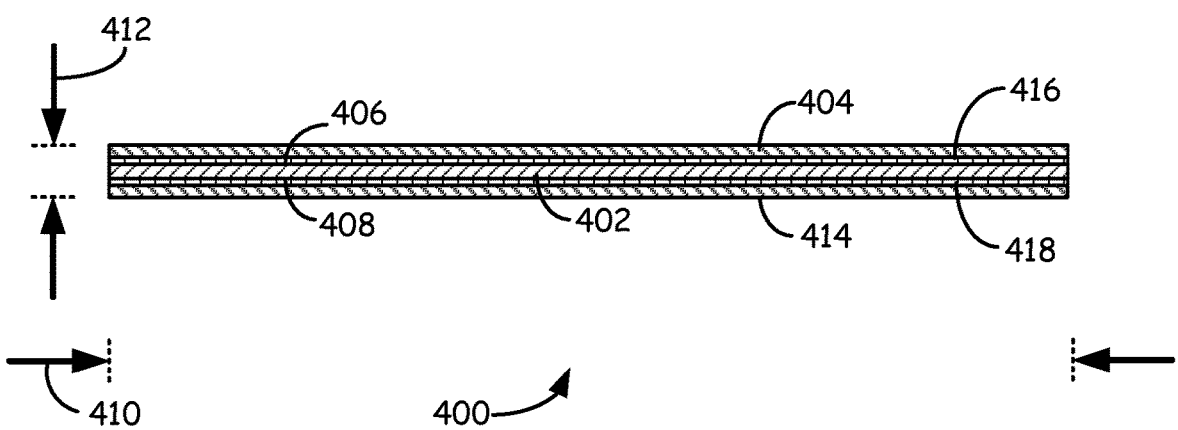
FIG. 13 is an alternative sectional view of section 3-3 taken in FIG. 2, illustrating a third alternative ribbon filament having two laminated surfaces with multiple layers.

FIGS. 11-13 are alternative sectional views of section 3-3 taken in FIG. 2, which illustrate multi-layer ribbon filaments of the present disclosure. As shown in FIG. 11, ribbon filament 200 has a cross-sectional profile similar to that of ribbon filament 34 (shown in FIG. 2). In this embodiment, however, ribbon filament 200 includes base portion 202 and layer 204, where base portion 202 includes top surface 206 and bottom surface 208, and where layer 202 is formed on top surface 206. Suitable dimensions for ribbon filament 200 include those discussed above for ribbon filament 34. Accordingly, examples of suitable widths for ribbon filament 200 (referred to as width 210) include those discussed above for width 40 of ribbon filament 34. Examples of suitable combined thicknesses of base portion 202 and layer 204 (referred to as thickness 212) include those discussed above for thickness 42 of ribbon filament 34.

Suitable materials for base portion 202 include the modeling and support materials discussed above for ribbon filament 34. Layer 204, however, may include different materials from base portion 202 that may assist in the build operation in system 10 (shown in FIG. 1). For example, many compositions for water-soluble support materials are relatively brittle, which can result in filament fracturing while being fed through an extrusion-based digital manufacturing system (e.g., system 10). To reduce the brittleness, layer 204 may be formed on top surface 206 as a thin coating from a non-brittle material that is at least partially soluble in water. This allows ribbon filament 200 to be fed through system 10 without fracturing or breaking, thereby increasing reliability in system 10. Relative to the bulk material of base portion 202, the thin coating of layer 204 provides a smalls amount of the non-brittle material. As such, even if the non-brittle material has a low solubility in water, the overall composition of support structure 26 has a water solubility that is close to that of the bulk material used to form base portion 202, thereby allowing the material of ribbon filament 200 to still function as a suitable water-soluble support material.

FIGS. 12 and 13 illustrate ribbon filaments 300 and 400, which are alternatives to ribbon filament 200, and where the reference labels are increased by "100" and "200" respectively. As shown in FIG. 12, ribbon filament 300 also includes layer 314 formed on bottom surface 308, thereby locating base portion 302 between layers 304 and 314. As shown in FIG. 12, ribbon filament 400 also includes layer 416 disposed between top surface 406 and layer 404, and layer 418 disposed between bottom surface 408 and layer 414. Accordingly, ribbon filaments of the present disclosure may include multiple layers, where each of the layers may include the same or different materials depending on the desired layer properties and on the processes used to form the given layers.

Ribbon filaments 200, 300, and 400 may each be formed generally in the same manner as discussed above for ribbon filaments 92, which may initially involve extruding a base sheet (e.g., sheet 90) with system 100, where the base sheet desirably has the same sheet thickness as the thickness respective base portion (e.g., base portions 202, 302, and 402) (shown in FIG. 9). One or more layers may then be formed on the base sheet surface(s) using a variety of coating techniques. The layer formation process is desirably performed prior to cutting the base sheet into multiple ribbon filaments (e.g., with system 128).

In one embodiment, each layer may be formed by initially forming an additional extruded sheet having a sheet thickness corresponding to the thickness of the given layer. The additional extruded sheet(s) may then be laminated on the base sheet and hot pressed between rollers to secure the layers to the base portion. In this embodiment, layers 416 and 418 of ribbon filament 400 may be used as tie layers to receptively secure layers 404 and 414 to base portion 402. The lamination process may be performed before the base sheet is wound up on a take-up spool (e.g., take-up spool 112), or, alternatively, the base sheet may be wound up on a take-up spool and subsequently unwound for the lamination process.

In an alternative embodiment, each layer may be formed by depositing or otherwise applying a coating onto the base sheet surface(s). For example, each coating may be deposited with a corona discharge unit, as discussed above. Alternatively, each coating may be formed with one or more conventional coating processes, such as knife coating processes and roller coating process.

In an additional alternative embodiment, each layer may be formed by co-extruding sheets of each layer along with the base sheet. This eliminates the use of a separate lamination or coating step to form the layer(s) and allows the dimensions of the multi-layer sheet to be defined with system 100 (e.g., at nip 126).

After the lamination and/or coating process is completed, the multi-layer sheet may then be cut into separate ribbon filaments (e.g., ribbon filaments 200, 300, and 400) with system 128. The resulting thicknesses of each layer may vary depending on the desired characteristics of the given layer and on the lamination or coating process used. Examples of suitable combined thicknesses for the layers of ribbon filaments 200, 300, and 400 include up to about 50% of the thickness of the ribbon filament (i.e., thickness 212, 312, or 412), with particularly suitable combined thicknesses ranging from about 1% to about 25% of the thickness of the ribbon filament, and even more particularly suitable combined thicknesses ranging from about 5% to about 25% of the thickness of the ribbon filament.

Ribbon filaments 200, 300, and 400 illustrate suitable examples of multi-layer ribbon filaments that may be manufactured with systems 100 and 128, and used with system 10 to build 3D models and/or support structures with reduced response times. The multi-layer nature of ribbon filaments 200, 300, and 400 also allow ribbon filaments to be formed from extruded sheets (e.g., sheet 90) and attain a variety of different physical and aesthetic properties.

In additional embodiments of the present disclosure, the above-discussed cylindrical and non-cylindrical filaments may also be hollow. Since the cross-sectional area of the plastic is reduced by the missing core, the hydraulic diameter of the hollow filament may also be less than the physical diameter. Accordingly, examples of suitable hydraulic diameters for the hollow filaments of the present disclosure include those discussed above. Furthermore, the liquefier may also include a mating core to the hollow filament, so that the extrudate is heated from the inside as well as the outside.

One potential additional advantage of a hollow filament is that when hollow filament is manufactured by rapid extrusion from a compounder, it is desirably rapidly cooled before it is retained on a supply assembly (e.g., spooled). That rapid cooling process may induce diameter changes in an otherwise solid filament that may vary along its length. In comparison, if a hollow filament is rapidly cooled, the inner surface of the hollow filament can vary in diameter, leaving the outer surface more uniform.

Another potential additional advantage of a hollow filament in the form of a cylindrical shell is compliance with the filament drive mechanism. A solid filament may be close to incompressible, so that a drive roller or drive teeth may obtain too little or too much traction if the filament diameter is slightly small or large. A hollow filament, however, provides compliance so that small variations in the filament diameter are compensated by variations in the amount of compression of the hollow filament.

Yet another potential additional advantage of a hollow filament is the reduced thermal conduction in the inlet of the liquefier. When a solid filament is stationary, heat may slowly conduct up the center of the filament to the zone above the heated portion of the liquefier where the walls are relatively cool. If the filament melts there, it tends to solidify against the cooler wall, potentially causing a large axial force to restart filament motion. The rate of heat conduction up a hollow filament, however, will be slower than the rate of conduction up a solid filament due to the lack of a core.

Although the present disclosure has been described with reference to preferred embodiments, workers skilled in the art will recognize that changes may be made in form and detail without departing from the spirit and scope of the disclosure.

The invention claimed is:

1. A method of forming a non-cylindrical filament for use in an extrusion-based additive manufacturing system to build a three-dimensional part or a support structure in a layer-by-layer manner, the method comprising:
   providing a multi-layer sheet of extrudable material, the sheet comprising a base layer and a next layer, wherein the base layer and the next layer are of different materials and at least one of the materials comprises a thermoplastic, wherein the base layer or the next layer comprises a thermoplastic loaded with carbon fiber; and
   cutting the sheet of extrudable material into strips to form individual ribbon filaments, each ribbon filament configured to be melted and extruded within a liquefier and each ribbon filament having a substantially uniform length and a substantially uniform rectangular cross-sectional profile along its length, wherein the cross-sectional profile of the individual ribbon filaments have has an aspect ratio between 2.5:1 and 20:1 of width to thickness, and each of the individual ribbon filaments exhibit a Young's Modulus value ranging from 1.0 gigapascal to 5.0 gigapascals.

2. The method of claim 1 and wherein providing a multi-layer sheet of extrudable material comprises co-extruding the multi-layer sheet of extrudable material.

3. The method of claim 1 wherein the materials of the first layer and the second layer both comprise thermoplastic materials.

4. The method of claim 1, wherein each ribbon filament has a glass transition temperature of 80° C. or higher.

5. The method of claim 4, wherein the multi-layer sheet and the resulting ribbon filament each have a thickness of between about 0.38 millimeters (about 0.015 inches) to about 1.3 millimeters (about 0.05 inches).

6. The method of claim 5 wherein the ribbon filament has a width of between about 2.5 millimeters (about 0.10 inches) to about 7.6 millimeters (about 0.30 inches).

7. The method of claim 1, wherein the ribbon filament exhibits a Young's Modulus value ranging from 1.5 gigapascal to 3.0 gigapascals.

8. The method of claim 1, wherein providing the multi-layer sheet of extrudable material comprises extruding the base layer, then laminating the next layer to the base layer.

9. The method of claim 1, wherein providing the multi-layer sheet of material comprises extruding the base layer, then forming the next layer on the base layer using one or more coating techniques.

10. The method of claim 1 and further comprising cooling the multi-layer sheet of extrudable material prior to cutting the multi-layer sheet of material into ribbon filaments.

11. The method of claim 1 and further comprising forming a topographical surface pattern in the multi-layer sheet prior to cutting the sheet of multi-layer material into ribbon filaments, to provide ribbon filaments having topographical surface patterns.

12. A method of forming a non-cylindrical filament for use in an extrusion-based additive manufacturing system to build a three-dimensional part or a support structure in a layer-by-layer manner, the method comprising:

provSiding a multi-layer sheet of extrudable material, wherein the sheet comprises a base layer, a top layer over the base layer, and a bottom layer beneath the base layer, wherein the base layer is a different material from the top and bottom layers and at least one of the materials comprises a thermoplastic, wherein at least one of the the top layer, the base layer and the middle layer comprises a thermoplastic loaded with carbon fibers; and cutting the sheets of material into strips to thereby form individual ribbon filaments, each ribbon filament configured to be melted and extruded with a liquefier and each ribbon filament having a substantially uniform length and a substantially uniform rectangular cross-sectional profile along its length, wherein the cross-sectional profile of each individual ribbon filament has an aspect ratio between 2.5:1 and 20:1 of width to thickness, and each individual ribbon filament exhibits a Young's Modulus value ranging from 1.0 gigapascal to 5.0 gigapascals.

13. The method of claim 12, wherein providing a sheet of extrudable material comprises co-extruding the base, top and bottom layers.

14. The method of claim 12, wherein providing a sheet of extrudable material comprises extruding the base layer and laminating sheets of the top and bottom layers to the base layer.

15. The method of claim 12, wherein the multi-layer sheet and the resulting ribbon filament each have a thickness of between about 0.38 millimeters (about 0.015 inches) to about 1.3 millimeters (about 0.05 inches).

16. The method of claim 15, wherein the ribbon filament has a width of between about 2.5 millimeters (about 0.10 inches) to about 7.6 millimeters (about 0.30 inches).

17. The method of claim 12, wherein providing the multi-layer sheet of material comprises forming at least one of the top layer and the bottom layer on the base layer using one or more coating techniques.

18. The method of claim 12, and further comprising forming a topographical surface pattern in the multi-layer sheet prior to cutting the sheet of multi-layer material into ribbon filaments, to provide ribbon filaments having topographical surface patterns.

19. The method of claim 12, wherein cutting is performed using a cutting roller.

* * * * *